(12) United States Patent  
Pitts

(10) Patent No.: US 6,366,952 B2  
(45) Date of Patent: Apr. 2, 2002

(54) CACHE CHANNEL AT NETWORK NODES TO PASS REQUEST AND DATA OR POINTER TO SHARED BUFFER

(75) Inventor: William Michael Pitts, Los Altos, CA (US)

(73) Assignee: Network Caching Technology, L.L.C., Palo Alto, CA (US)

(*) Notice: Subject to any disclaimer, the term of this patent is extended or adjusted under 35 U.S.C. 154(b) by 0 days.

(21) Appl. No.: 09/811,331

(22) Filed: Mar. 16, 2001

Related U.S. Application Data

(60) Continuation of application No. 09/382,311, filed on Aug. 24, 1999, now Pat. No. 6,205,475, which is a continuation of application No. 09/144,602, filed on Aug. 31, 1998, now Pat. No. 6,026,452, which is a division of application No. 08/806,441, filed on Feb. 26, 1997, now Pat. No. 5,892,914, which is a division of application No. 08/343,477, filed as application No. PCT/US92/04939 on Jun. 3, 1992, now Pat. No. 5,611,049.

(51) Int. Cl.[7] .............................................. G06F 15/163
(52) U.S. Cl. ..................... 709/217; 709/213; 709/219
(58) Field of Search ................................ 709/213, 219, 709/217

(56) References Cited

U.S. PATENT DOCUMENTS 5,056,003 A  * 10/1991  Hammer et al. ............. 709/310
5,315,707 A  *  5/1994  Seaman et al. ............... 710/56

* cited by examiner

Primary Examiner—Kenneth S. Kim  
(74) Attorney, Agent, or Firm—D. E. Schreiber, Esq.

(57) ABSTRACT

A network of digital computers includes Network Distributed Cache ("NDC") sites. Each NDC site includes an NDC that has an NDC buffer. One of the NDC sites receives a request to access data in a stored dataset. The receiving NDC checks its NDC buffer for a projected image of requested data. If the NDC buffer lacks the requested data, and if the NDC site is not the NDC server terminator site for the requested data, the NDC site transmits the request to an NDC site that is closer to the NDC server terminator site. When a requesting NDC site and the request receiving NDC site having a projected image of the requested data both have this NDC buffers located in a shared memory, the NDC site having the data transmits to the requesting NDC a pointer to a location in its NDC buffer for the data.

1 Claim, 22 Drawing Sheets

```
/************************************************************
 * Channel Structure:
 ************************************************************/ typedef struct channel {
    u_long          c_flags;        /* see defines below              */
    struct channel  *c_forw;        /* hash chain ptrs                */
    struct channel  *c_back;
    struct channel  *av_forw;       /* free list ptrs                 */
    struct channel  *av_back;
    u_long          c_state;        /* see defines below              */
    struct channel  *c_head;        /* pointer to primary channel     */
    NDC_FH          fh;             /* file handle                    */
    u_short         c_error;        /* channel error code             */
    u_short         resid_err;      /* unreported error from prev op  */
    u_short         flush_level;    /* channel flush level            */
    u_short         s_spare1;       /*                                */
    u_long          refresh;        /* time of last attributes refresh*/
    u_long          c_size;         /* size of file, channel's view   */
    time_t          atime;          /* local time of last access      */
    time_t          mtime;          /* local time of last modification*/
    time_t          ctime;          /* local time file created        */
    NDC_STATS       stats;          /* filesystem stats               */
    NDC_ATTR        attr;           /* cached copy of attributes      */
    NDC_USS         *uss;           /* ptr to list of upstream sites  */
    INODE           *ip;            /* inode pointer                  */
    struct channel  *server_cp;     /* downstream server's channel ptr*/
    NDC_PID         server_addr;    /* address of the downstream site */
    NDC_MSG         *req_msg;       /* request msg being processed    */
    NDC_MSG         *msg_up;        /* upstream msg chain ptr         */
    NDC_MSG         *msg_down;      /* downstream msg chain ptr       */
    SUBCHANNEL      sc;             /* 1st subchannel (built in)      */
    RATE            c_rate;         /* channel data rate              */
    RATE            f_rate;         /* file data rate                 */
    int             relse_time;     /* time: channel placed on free list */
    int             splice_pnt;     /* channel splice point           */
    int             splice_cnt;     /* channel splice count           */
} CHANNEL;
```

FIG. 4A

```
typedef struct subchannel {
    struct channel   *next;                   /* ptr to next subchannel          */
    struct channel   *ext;                    /* ptr to subchannel extension     */
    long             offset;                  /* offset to start of segment      */
    long             seg_length;              /* amount of data in this subchannel */
    long             ext_length;              /* amount of data in this extent   */
    long             splice_pnt;              /* expected start of next request  */
    RATE             rate;                    /* client data rate                */
    long             bufcount;                /* # of buffers in bp[] array      */
    NDC_BD           bd[NDC_MAX_BDS_SC];      /* buffer descriptor array         */
} SUBCHANNEL;

typedef struct {
    long             flags;                   /* flags: see below                */
    u_short          leader;                  /* # of invalid leading bytes      */
    u_short          trailer;                 /* # of invalid trailing bytes     */
    vme_t            addr;                    /* address of buffer               */
    struct buf       *bp;                     /* address of buffer header        */
} NDC_BD;

/* NDC_BD.flags:    */ define BD_RECEIVE_DATA    0x0001    /* buffer expecting WRITE data     */
define BD_FRAG_REPLACE    0x0002    /* frag was REPLACEd               */
#define BD_FRAG_EXTEND     0x0004    /* frag was EXTENDed               */
define BD_DIRTY_DATA      0x0008    /* buffer is DIRTY                 */ define BD_INVAL           0x0010    /* buffer is INVALID               */
define BD_MAPPED          0x0020    /* buffer has been MAPPED          */
#define BD_FLUSHED         0x0040    /* buffer is being FLUSHed         */
#define BD_CONJURED_BUF    0x0080    /* buffer was CONJURED             */
```

FIG. 4B

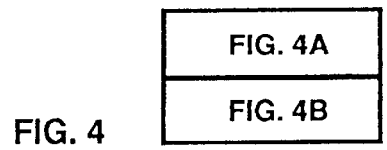

FIG. 4

```
/*
 * CHANNEL.c_flags:
 */
#define C_READ              0x00000001  /* reading                              */
#define C_WRITE             0x00000002  /* writing                              */
#define C_DECEASE           0x00000004  /* kill channel on release              */
#define C_P_FLUSH           0x00000008  /* partial flush has been received      */
#define C_EXCL              0x00000010  /* exclusive create                     */
#define C_ASYNC             0x00000020  /* client says "don't wait"             */
#define C_NOCACHE           0x00000040  /* discard channel on release           */
#define C_ASYNC_IO          0x00000080  /* don't wait for I/O completion        */
#define C_EOF               0x00000100  /* attempted to LOAD past the EOF       */
#define C_BUSY              0x00000200  /* not on av_forw/back list             */
#define C_ERROR             0x00000400  /* error occurred, cp->c_error set      */
#define C_BLOCKED           0x00000800  /* awaiting response to a request       */
#define C_LOAD_AGAIN        0x00001000  /* all data NOT delivered, try again    */
#define C_RELOAD            0x00002000  /* second pass through ndc_load()       */
#define C_XXX6              0x00004000  /*                                      */
define C_XXX7              0x00008000  /*                                      */ define C_DIRTY_DATA        0x00010000  /* channel data has been modified       */
define C_DIRTY_ATTRS       0x00020000  /* channel attrs have been modified     */
#define C_SOILED_ATTRS      0x00040000  /* attr times have been modified        */
#define C_DELAYED_WRITE     0x00080000  /* channel is DIRTY                     */
#define C_CACHE_DATA        0x00100000  /* requested data found in the cache    */
#define C_CACHE_ATTRS       0x00200000  /* requested meta found in the cache    */
#define C_DATA_VALID        0x00400000  /* valid data present                   */
#define C_ATTRS_VALID       0x00800000  /* valid attrs present                  */
#define C_WANTED            0x01000000  /* issue wakeup when BUSY goes off      */
#define C_LOCKED            0x02000000  /* locked in core (not LRUable)         */
#define C_EMPTY             0x04000000  /* channel has no buffers assigned      */
#define C_DESTROY           0x08000000  /* channel is marked for destruction    */
#define C_XXX8              0x10000000  /*                                      */
#define C_SUBCHANEXT        0x20000000  /* this is a subchannel extension       */
#define C_SUBCHANNEL        0x40000000  /* this is a subchannel                 */
define C_HEAD              0x80000000  /* a channel header, not a channel      */ define CHANNEL_DIRTY        ( C_DIRTY_DATA | C_DIRTY_ATTRS )

define NDC_PROPAGATE_UP_FLAGS
#define NDC_PROPAGATE_DOWN_FLAGS    (C_EXCL|C_ASYNC|C_NOCACHE)
```

FIG. 5

```
/*
 * CHANNEL.c_state:
 */
#define NDC_SITE_READING                    C_READ
#define NDC_SITE_WRITING                    C_WRITE
#define NDC_SITE_ACTIVE                     (C_READ | C_WRITE)

#define NDC_SITE_IS_CCS                     0x00000010
define NDC_SITE_CACHING_ENABLED            0x00000020 define NDC_SITE_REQUEST_REJECTED           0x00000100
define NDC_SITE_ACCEPT_REJECTEE            0x00000200
define NDC_SITE_DEADLY_EMBRACE_REJECTED    0x00000400 define NDC_SITE_CLIENT_TERM                0x00001000
define NDC_SITE_SERVER_TERM                0x00002000 define NDC_SITE_ALL_DEAD                   0x00010000
define NDC_SITE_NEW_CHANNEL                0x00020000 define NDC_SITE_NEEDS_SERVICE              0x00100000
define NDC_SITE_CLIENT_WRITE_THRU          0x00200000 define NDC_SITE_REBOOTING                  0x20000000
define NDC_SITE_OFFLINE                    0x40000000
#define NDC_SITE_ONLINE                     0x80000000

/*
 * USE_ONCE & USE_MANY are defined to keep in sync with
 * external documentation.
 */
#define USE_ONCE                            0x00000000
#define USE_MANY                            NDC_SITE_CACHING_ENABLED
```

FIG. 6

```
/****************************************************************
 * Data Transport Protocol:
 ****************************************************************/

/*
 * NDC_MSG.type:
 */ define NDC_ID                   ( (long)( ('W'<<8) | ('H') ) << 16 )

/*  Configuration: */ define NDC_GET_VERSION_NO       ( 1 | NDC_ID )
define NDC_MOUNT                ( 2 | NDC_ID )
#define NDC_UNMOUNT              ( 3 | NDC_ID )

/*  Data Transfer: */ define NDC_LOAD                 ( 4 | NDC_ID )
define NDC_FLUSH                ( 5 | NDC_ID )

#define NDC_LOAD_RELEASE         ( 8 | NDC_ID )
#define NDC_FLUSH_RELEASE        ( 9 | NDC_ID )

/*  Control:        */ define NDC_LOOKUP               ( 16 | NDC_ID )
define NDC_CREATE               ( 17 | NDC_ID )
#define NDC_REMOVE               ( 18 | NDC_ID )
#define NDC_RENAME               ( 19 | NDC_ID )
#define NDC_LINK                 ( 20 | NDC_ID )
#define NDC_SYMLINK              ( 21 | NDC_ID )
#define NDC_RMDIR                ( 22 | NDC_ID )
#define NDC_STATFS               ( 23 | NDC_ID )
#define NDC_FSYNC                ( 24 | NDC_ID )
#define NDC_ACCESS               ( 25 | NDC_ID )
#define NDC_SYNCFS               ( 26 | NDC_ID )
#define NDC_QUOTA                ( 27 | NDC_ID )

#define NDC_DISABLE              ( 30 | NDC_ID )
#define NDC_RECALL               ( 31 | NDC_ID )
```

FIG. 9

```
typedef struct ndc_msg {
    long        type;                           /* message type         */
    short       error;                          /* error type           */
    u_short     flags;                          /* message flags        */
    union {
        union {                                 /* NFS Proc #'s:        */
            NDC_MOUNT_INFO      marg;       /*                      */
            NDC_FH              fh;         /* 1, 5, 17             */
            NDC_ATTR            sarg;       /* 2                    */
            NDC_DIROP_ARGS      darg;       /* 4, 10, 15            */
            NDC_LOAD_ARGS       rdarg;      /* 6                    */
            NDC_FLUSH_ARGS      flarg;      /* 8                    */
            NDC_RELEASE_ARGS    relarg;     /*                      */
            NDC_CREATE_ARGS     carg;       /* 9, 14                */
            NDC_RENAME_ARGS     rarg;       /* 11                   */
            NDC_LINK_ARGS       larg;       /* 12                   */
            NDC_SYMLINK_ARGS    slarg;      /* 13                   */
            NDC_PARTITION       part;       /*                      */
            NDC_DAEMON_TASK     task;       /* task for daemon      */
            NDC_MSG_CHAIN       mc;         /* message chain        */
            NDC_SP_RW           sp;         /* SP read/write        */
            NDC_CC_RECALL_ARGS  rcarg;      /* recall/disable caches */
        } in;
        union {                                 /* NFS Proc #'s:        */
            NDC_MOUNT_INFO      mres;       /*                      */
            NDC_STATS           stats;      /* 17                   */
            NDC_ATTR            attr;       /* 1, 2                 */
            NDC_DIROP_RES       dirres;     /* 4, 9, 14             */
            NDC_DATA            data;       /* 5                    */
            NDC_LOAD_RES        rdres;      /* 6                    */
            NDC_FLUSH_RES       flres;      /*                      */
            NDC_PARTITION       part;       /*                      */
            NDC_DAEMON_TASK     task;       /* task for daemon      */
            NDC_MSG_CHAIN       mc;         /* message chain        */
            NDC_SP_RW           sp;         /* SP read/write        */
            NDC_CC_RECALL_RES   rcres;      /* recall/disable caches */
        } out;
    } un;
} NDC_MSG;

#define req    un.in
#define rsp    un.out
```

FIG. 10A

```
/*
 *   NDC_MSG.flags:
 */

/*
 *          consistency control
 */
#define NDC_MSG_SITE_READING      0x0001          /* down      */
#define NDC_MSG_SITE_WRITING      0x0002          /* down      */
#define NDC_MSG_SITE_RW_MASK      0x0003          /* down      */
#define NDC_MSG_SITE_RELEASE      0x0004          /* down      */
#define NDC_MSG_SITE_DECEASE      0x0008          /* down      */
#define NDC_MSG_SITE_ENABLED      0x0010          /* up        */
/*
 *          request modifiers
 */
#define NDC_REQ_EXCL              0x0020          /* down      */
#define NDC_REQ_ASYNC             0x0040          /* down      */
#define NDC_REQ_NOCACHE           0x0080          /* down      */
/*
 *          request specific flags (overlaid)
 */
#define NDC_MSG_XACT_DONE         0x0100          /* recall    */
#define NDC_LOAD_ATTRS_ONLY       0x0100          /* read      */
#define NDC_MSG_DATA_IS_COMMON    0x0200          /* read      */
#define NDC_MSG_CONVERT_DATA      0x0400          /* readdir   */
/*
 *          response status
 */
#define NDC_MSG_DATA_COMPLETE     0x1000          /* up/down   */
#define NDC_MSG_ATTRS_PRESENT     0x2000          /* up/down   */
#define NDC_RSP_REQUEST_REJECT    0x4000          /* up        */
#define NDC_MSG_DONE              0x8000          /* local     */
```

FIG. 10B

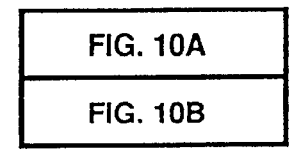

FIG. 10

```
typedef struct filehandle {
    long        fsid;              /* filesystem id           */
    long        fid;               /* file id                 */
    long        gen;               /* generation number       */
} NDC_FH;

typedef long   NDC_PID;
```

FIG. 11A

```
/*
 * NDC_DATA.flags:
 */
#define NDC_DATA_DIRECT      0x00    /* data present within structure  */
define NDC_DATA_INDIRECT    0x01    /* pointer to data is present     */ typedef struct {
    u_short     flags;
    u_short     len;
    union {
        vme_t       ptr;
        u_char      bytes;
    } un;
} NDC_DATA;                          /* size: 8 or (4 + len)           */
```

FIG. 11B

```
typedef struct {
    long        fsid;              /* File System ID                      */
    long        s_num;             /* Server mgr num. (i.e. 0, 1, ...)    */
    NDC_PID     s_pid;             /* Server manager to own partition     */
    NDC_PID     sp_pid;            /* PID of SP that partition is on      */
    long        drive_set;         /* Which bank of drives is disk in     */
    long        disk_num;          /* Whic disk in bank is partition on   */
    long        base;              /* Base of partition in 512 byte blocks */
    long        len;               /* Length of partition in 512 byte blks */
} NDC_PARTITION;
```

FIG. 11C

```
typedef struct {
    u_char      spare;       /* spare                              */
    u_char      status;      /* attributes status (see below)      */
    u_short     mode;        /* file's access mode and type        */
    uid_t       uid;         /* owner user id                      */
    gid_t       gid;         /* owner group id                     */
    u_long      size;        /* file size in bytes                 */
    time_t      atime;       /* time of last access                */
    time_t      mtime;       /* time of last modification          */
} NDC_SATTR;                 /* size: 20                           */

/*
 * NDC_ATTR.status:
 */
#define F_ACC        0x01    /* file has been accessed             */
#define F_UPD        0x02    /* file has been modified             */
#define F_CHG        0x04    /* inode has been changed             */
define F_XXX        0x08    /*                                    */ define F_ACC_SET    0x10    /* inode access time set by client    */
define F_UPD_SET    0x20    /* inode modify time set by client    */
#define F_SIZE_SET   0x40    /* setattr changed the file size      */
#define F_LOCK_SET   0x80    /* set file lock                      */
```

FIG. 11D

```
typedef struct {
    NDC_PID         daemon_pid;    /* daemon assigned to this message */
    struct ndc_msg  *msg_ptr;      /* message pointer                 */
    struct channel  *cp;           /* channel pointer                 */
} NDC_DAEMON_TASK;                 /* size: 12                        */
```

FIG. 11E

```
typedef struct ndc_upstream_site {
    struct ndc_up_site  *next;          /* pointer to next uss        */
    short               error;          /* error, if any, upstream    */
    short               spare;
    short               current_state;  /* what we think's happening  */
    short               actual_state;   /* what's really happening    */
    NDC_PID             upstream_pid;   /* address of upstream site   */
} NDC_USS;
```

FIG. 11F

```c
/*
 * Buffer Descriptor:
 *
 * An NDC_BUF_DESC uses the high order bits to address the
 * common memory data buffer.  Since the buffers are aligned on
 * block boundaries (8K and likely to grow in the future), the low
 * order bits can be used to specify:
 *
 *   o the segment number to which the buffer belongs for READs,
 *
 *   o the number of invalid trailing bytes in the buffer for WRITEs.
 *
 *      NDC_BUF_DESC:   AAAAAAAA AAAAAAAA AAASSSSS SSSSSSSS
 */
typedef long              NDC_BUF_DESC;

/*
 * Segment Descriptor:
 */
typedef struct {
    long       offset;
    long       count;
} NDC_SD;                  /* size: 8                              */

/*
 * Flush Descriptor:
 */
typedef struct {
    long            offset;   /* offset, need not be block aligned  */
    NDC_BUF_DESC bd;          /* buffer descriptor                  */
} NDC_FLUSH_DESC;             /* size: 8                            */
```

FIG. 11G

```
typedef struct {
    struct channel    *cp;            /* channel ptr: read_more, read_relse  */
    NDC_FH            fh;             /* file handle                         */
    long              no_segs;        /* # of segments to read               */
    NDC_SD            sd[MAX_SEGS];   /* segment descriptors                 */
} NDC_LOAD_ARGS;                      /* size: 20 + (8 * X)                  */ typedef struct {
    struct channel    *cp;            /* channel ptr: read_more, read_relse  */
    short             bd_cnt;         /* # of bd[]s being returned           */
    short             seg_cnt;        /* # of segments being returned        */
    NDC_BUF_DESC      bd[MAX_BDS];    /* buf descriptors                     */
    NDC_ATTR          attr;           /* note: bd[] may overrun attrs when   */
                                      /*   NDC_RSP_ATTRS_PRESENT is not set  */
} NDC_LOAD_RES;                       /* size: 56 + (4 * X)                  */ typedef struct {
    struct channel    *cp;            /* chan ptr: flush_more, flush_relse   */
    NDC_FH            fh;             /* file handle                         */
    short             level;          /* flush level                         */
    short             no_fds;         /* # of fd[]s being flushed            */
    NDC_SATTR         sattr;          /* file attributes (writable)          */
    NDC_FLUSH_DESC    fd[MAX_FDS];    /* flush descriptors                   */
} NDC_FLUSH_ARGS;                     /* size: 40 + (8 * X)                  */ typedef struct {
    struct channel    *cp;            /* chan ptr: flush_more, flush_relse   */
    NDC_FH            fh;             /* file handle                         */
    short             level;          /* flush level                         */
    short             no_fds;         /* # of fd[]s being flushed            */
    NDC_ATTR          attr;           /* file attributes                     */
} NDC_FLUSH_RES;                      /* size: 68                            */ typedef struct {
    struct channel    *cp;            /* channel pointer                     */
    NDC_FH            fh;             /* file handle                         */
    short             error;          /* error                               */
} NDC_RELEASE_ARGS;                   /* size: 18                            */
```

FIG. 11H

```
typedef struct {
    NDC_FH          fh;
    NDC_DATA        name;
} NDC_DIROP_ARGS;                   /* size: 20 or 16 + NDC_DATA.len        */ typedef struct {
    NDC_FH          fh;
    NDC_ATTR        attr;
} NDC_DIROP_RES;                    /* size: 60                             */ typedef struct {
    NDC_DIROP_ARGS  where;
    NDC_ATTR        attr;
} NDC_CREATE_ARGS;                  /* size: 68 or 64 + NDC_DATA.len        */ typedef struct {
    NDC_DIROP_ARGS  from;
    NDC_DIROP_ARGS  to;
} NDC_RENAME_ARGS;                  /* size: 2*(20 or 16 + NDC_DATA.len)    */ typedef struct {
    NDC_FH          from;
    NDC_DIROP_ARGS  to;
} NDC_LINK_ARGS;                    /* size: 32 or 28 + NDC_DATA.len        */ typedef struct {
    NDC_DIROP_ARGS  from;
    NDC_ATTR        attr;
    NDC_DATA        link;
} NDC_SYMLINK_ARGS;                 /* size: 76 or 68 + (2*NDC_DATA.len)    */ typedef struct {
    NDC_FH          file;           /* OUT: filesystem root file handle     */
    NDC_PARTITION   part;           /* IN/OUT: Describes partition to use   */
    NDC_DATA        path;           /* IN: mount point pathname             */
} NDC_MOUNT_INFO;                   /* size: 52 or 48 + NDC_DATA.len        */
```

FIG. 11I

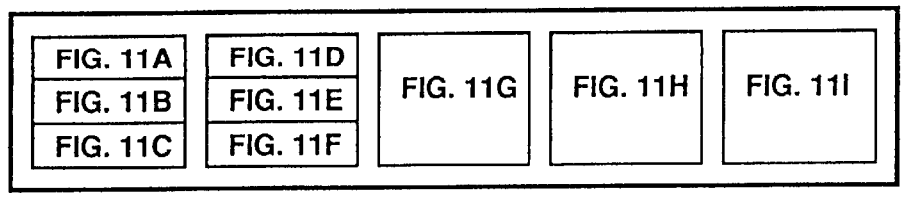

FIG. 11

```
/*
 * Message chains are used to group together a series of related messages
 * that are to be submitted and processed as an atomic unit.  A message chain
 * is "done" only when all messages have been dispatched to their respective
 * destinations and the response for each message has been received.  All
 * message types capable of being chained must align with the structure
 * NDC_MSG_CHAIN defined below.  The message types that employ chaining
 * are:  NDC_SP_RW, and NDC_CC_RECALL_ARGS/NDC_CC_RECALL_RES.
 */
typedef struct {
        struct channel      *msg_head_cp;
        struct ndc_msg      *next_msg;
} NDC_MSG_CHAIN;

typedef struct {
        struct channel      *msg_head_cp;
        struct ndc_msg      *next_msg;
        u_char              scsi_id;
        u_char              disk_number;
        short               sector_cnt;
        short               block_size;
        u_long              sector_adr;
        vme_t               vme_adr[NDC_SP_MAX_CONTIG];
} NDC_SP_RW;                            /* size: 20 + (4 * X)          */ typedef struct {
        struct channel      *msg_head_cp;
        struct ndc_msg      *next_msg;
        struct channel      *uss_cp;
        NDC_FH              fh;
        short               expected_state;
} NDC_CC_RECALL_ARGS;                   /* size: 26                    */ typedef struct {
        struct channel      *msg_head_cp;
        struct ndc_msg      *next_msg;
        struct channel      *uss_cp;
        short               actual_state;
        short               no_fds;         /* # of fd[]s being flushed */
        long                size;           /* file size                */
        time_t              mtime;          /* modification time        */
        NDC_FLUSH_DESC      fd[MAX_FDS];
} NDC_CC_RECALL_RES;                    /* size: 24 + (8 * X)          */
```

FIG. 12

```
typedef struct {
    u_char    vfs_flag;    /* filesystem flags                        */
    u_char    status;      /* attributes status (see below)           */
    u_short   b_limit;     /* block limit: !0 => max delta more       */
    u_short   type;        /* vnode type (for create)                 */
    u_short   mode;        /* file's access mode and type             */
    uid_t     uid;         /* owner user id                           */
    gid_t     gid;         /* owner group id                          */
    short     nlink;       /* number of references to file            */
    dev_t     rdev;        /* device the file represents              */
    long      fsid;        /* file system id (dev for now)            */
    long      nodeid;      /* node id                                 */
    u_long    size;        /* file size in bytes                      */
    long      blocks;      /* kbytes of disk space held by file       */
    long      blocksize;   /* blocksize preferred for i/o             */
    time_t    atime;       /* time of last access                     */
    time_t    mtime;       /* time of last modification               */
    time_t    ctime;       /* time file created                       */
} NDC_ATTR;                /* size: 48                                */
```

FIG. 13A

```
typedef struct {
    long      bsize;       /* fundamental file system block size      */
    long      blocks;      /* total blocks in file system             */
    long      bfree;       /* free blocks in fs                       */
    long      bavail;      /* free blocks avail to non-superuser      */
    u_long    files;       /* total number of file slots              */
    u_long    ffree;       /* number of free file slots               */
} NDC_STATS;               /* size: 24                                */
```

CACHE CHANNEL AT NETWORK NODES TO PASS REQUEST AND DATA OR POINTER TO SHARED BUFFER

This application is a continuation of Ser. No. 09/382,311 filed Aug. 24, 1999 that issued Mar. 20, 2001, as U.S. Pat. No. 6,205,475 as U.S. Pat. No. 6,205,475; which is a continuation of Ser. No. 09/144,602 filed Aug. 31, 1998, that issued Feb. 15, 2000, as U.S. Pat. No. 6,026,452; which is a division of Ser. No. 08/806,441 filed Feb. 26, 1997, that issued Apr. 6, 1999, as U.S. Pat. No. 5,892,914; which is a division of Ser. No. 08/343,477 filed Nov. 28, 1994, that issued Mar. 11, 1997, as U.S. Pat. No. 5,611,049, and that claimed priority under 35 U.S.C. § 371 from Patent Cooperation Treaty ("PCT") International Patent Application PCT/US92/04939 filed Jun. 3, 1992.

TECHNICAL FIELD

The present invention relates generally to the technical field of multi-processor digital computer systems and, more particularly, to multi-processor computer systems in which:

1. the processors are loosely coupled or networked together;
2. data needed by some of the processors is controlled by a different processor that manages the storage of and access to the data;
3. processors needing access to data request such access from the processor that controls the data;
4. the processor controlling data provides requesting processors with access to it.

BACKGROUND ART

Within a digital computer system, processing data stored in a memory; e.g., a Random Access Memory ("RAM") or on a storage device such as a floppy disk drive, a hard disk drive, a tape drive, etc.; requires copying the data from one location to another prior to processing. Thus, for example, prior to processing data stored in a file in a comparatively slow speed storage device such as hard disk, the data is first copied from the computer system's hard disk to its much higher speed RAM. After data has been copied from the hard disk to the RAM, the data is again copied from the RAM to the computer system's processing unit where it is actually processed. Each of these copies of the data, i.e., the copy of the data stored in the RAM and the copy of the data processed by the processing unit, can be considered to be image of the data stored on the hard disk. Each of these images of the data may be referred to as a projection of the data stored on the hard disk.

In a loosely coupled or networked computer system having several processors that operate autonomously, the data needed by one processor may be accessed only by communications passing through one or more of the other processors in the system. For example, in a Local Area Network ("LAN") such as Ethernet one of the processors may be dedicated to operating as a file server that receives data from other processors via the network for storage on its hard disk, and supplies data from its hard disk to the other processors via the network. In such networked computer systems, data may pass through several processors in being transmitted from its source at one processor to the processor requesting it.

In some networked computer systems, images of data are transmitted directly from their source to a requesting processor. One operating characteristic of networked computer systems of this type is that, as the number of requests for access to data increase and/or the amount of data being transmitted in processing each request increases, ultimately the processor controlling access to the data or the data transmission network becomes incapable of responding to requests within an acceptable time interval. Thus, in such networked computer systems, an increasing workload on the processor controlling access to data or on the data transmission network ultimately causes unacceptably long delays between a processor's request to access data and completion of the requested access.

In an attempt to reduce delays in providing access to data in networked computer systems, there presently exist systems that project an image of data from its source into an intermediate storage location in which the data is more accessible than at the source of the data. The intermediate storage location in such systems is frequently referred to as a "cache," and systems that project images of data into a cache are be referred to as "caching" systems.

An important characteristic of caching systems, frequently referred to as "cache consistency" or "cache coherency," is their ability to simultaneously provide all processors in the networked computer system with identical copies of the data. If several processors concurrently request access to the same data, one processor may be updating the data while another processor is in the process of referring to the data being updated. For example, in commercial transactions occurring on a networked computer system one processor may be accessing data to determine if a customer has exceeded their credit limit while another processor is simultaneously posting a charge against that customer's account. If a caching system lacks cache consistency, it is possible that one processor's access to data to determine if the customer has exceeded their credit limit will use a projected image of the customer's data that has not been updated with the most recent charge. Conversely, in a caching system that possesses complete or absolute cache consistency, the processor that is checking the credit limit is guaranteed that the data it receives incorporates the most recent modifications.

One presently known system that employs data caching is the Berkeley Software Distribution ("BSD") 4.3 version of the Unix timesharing operating system. The BSD 4.3 system includes a buffer cache located in the host computer's RAM for storing projected images of blocks of data, typically 8 k bytes, from files stored on a hard disk drive. Before a particular item of data may be accessed on a BSD 4.3 system, the requested data must be projected from the hard disk into the buffer cache. However, before the data may be projected from the disk into the buffer cache, space must first be found in the cache to store the projected image. Thus, for data that is not already present in a BSD 4.3 system's buffer cache, the system must perform the following steps in providing access to the data:

Locate the buffer in the RAM that contains the Least Recently Used ("LRU") block of disk data.

Discard the LRU block of data which may entail writing that block of data back to the hard disk.

Project an image of the requested block of data into the now empty buffer.

Provide the requesting processor with access to the data.

If the data being accessed by a processor is already present in a BSD 4.3 system's data cache, then responding to a processor's request for access to data requires only the last operation listed above. Because accessing data stored in RAM is much faster that accessing data stored on a hard disk, a BSD 4.3 system responds to requests for access to data that is present in its buffer cache in approximately ½50th the time that it takes to respond to a request for access to data that is not already present in the buffer cache.

The consistency of data images projected into the buffer cache in a BSD 4.3 system is excellent. Since the only path from processors requesting access to data on the hard disk is through the BSD 4.3 system's buffer cache, out of date blocks of data in the buffer cache are always overwritten by their more current counterpart when that block's data returns from the accessing processor. Thus, in the BSD 4.3 system an image of data in the system's buffer cache always reflects the true state of the file. When multiple requests contend for the same image, the BSD 4.3 system queues the requests from the various processors and sequences the requests such that each request is completely serviced before any processing commences on the next request. Employing the preceding strategy, the BSD 4.3 system ensures the integrity of data at the level of individual requests for access to segments of file data stored on a hard disk.

Because the BSD 4.3 system provides access to data from its buffer cache, blocks of data on the hard disk frequently do not reflect the true state of the data. That is, in the BSD 4.3 system, frequently the true state of a file exists in the projected image in the system's buffer cache that has been modified since being projected there from the hard disk, and that has not yet been written back to the hard disk. In the BSD 4.3 system, images of data that are more current than and differ from their source on the hard disk data may persist for very long periods of time, finally being written back to the hard disk just before the image is about to be discarded due to its "death" by the LRU process. Conversely, other caching systems exist that maintain data stored on the hard disk current with its image projected into a data cache. Network File System ("NFS®") is one such caching system.

In many ways, NFS's client cache resembles the BSD 4.3 systems buffer cache. In NFS, each client processor that is connected to a network may include its own cache for storing blocks of data. Furthermore, similar to BSD 4.3, NFS uses the LRU algorithm for selecting the location in the client's cache that receives data from an NFS server across the network, such as Ethernet. However, perhaps one of NFS's most significant differences is that images of blocks of data are not retrieved into NFS's client cache from a hard disk attached directly to the processor as in the BSD 4.3 system. Rather, in NFS images of blocks of data come to NFS's client cache from a file server connected to a network such as Ethernet.

The NFS client cache services requests from a computer program executed by the client processor using the same general procedures described above for the BSD 4.3 system's buffer cache. If the requested data is already projected into the NFS client cache, it will be accessed almost instantaneously. If requested data is not currently projected into NFS's client cache, the LRU algorithm must be used to determine the block of data to be replaced, and that block of data must be discarded before the requested data can be projected over the network from the file server into the recently vacated buffer.

In the NFS system, accessing data that is not present in its client cache takes approximately 500 times longer than accessing data that is present there. About one-half of this delay is due to the processing required for transmitting the data over the network from an NFS file server to the NFS client cache. The remainder of the delay is the time required by the file server to access the data on its hard disk and to transfer the data from the hard disk into the file server's RAM.

In an attempt to reduce this delay, client processors read ahead to increase the probability that needed data will have already been projected over the network from the file server into the NFS client cache. When NFS detects that a client processor is accessing a file sequentially, blocks of data are asynchronously pre-fetched in an attempt to have them present in the NFS client cache when the client processor requests access to the data. Furthermore, NFS employs an asynchronous write behind mechanism to transmit all modified data images present in the client cache back to the file server without delaying the client processor's access to data in the NFS client cache until NFS receives confirmation from the file server that it has successfully received the data. Both the read ahead and the write behind mechanisms described above contribute significantly to NFS's reasonably good performance. Also contributing to NFS's good performance is its use of a cache for directories of files present on the file server, and a cache for attributes of files present on the file server.

Several features of NFS reduce the consistency of its projected images of data. For example, images of file data present in client caches are re-validated every 3 seconds. If an image of a block of data about to be accessed by a client is more than 3 seconds old, NFS contacts the file server to determine if the file has been modified since the file server originally projected the image of this block of data. If the file has been modified since the image was originally projected, the image of this block in the NFS client cache and all other projected images of blocks of data from the same file are removed from the client cache. When this occurs, the buffers in RAM thus freed are queued at the beginning of a list of buffers (the LRU list) that are available for storing the next data projected from the file server. The images of blocks of data discarded after a file modification are re-projected into NFS's client cache only if the client processor subsequently accesses them.

If a client processor modifies a block of image data present in the NFS client cache, to update the file on the file server NFS asynchronously transmits the modified data image back to the server. Only when another client processor subsequently attempts to access a block of data in that file will its cache detect that the file has been modified.

Thus, NFS provides client processors with data images of poor consistency at reasonably good performance. However, NFS works only for those network applications in which client processors don't share data or, if they do share data, they do so under the control of a file locking mechanism that is external to NFS. There are many classes of computer application programs that execute quite well if they access files directly using the Unix File System that cannot use NFS because of the degraded images projected by NFS.

Another limitation imposed by NFS is the relatively small size (8 k bytes) of data that can be transferred in a single request. Because of this small transfer size, processes executing on a client processor must continually request additional data as they process a file. The client cache, which typically occupies only a few megabytes of RAM in each client processor, at best, reduces this workload to some degree. However, the NFS client cache cannot mask NFS's fundamental character that employs constant, frequent communication between a file server and all of the client processors connected to the network. This need for frequent server/client communication severely limits the scalability of an NFS network, i.e., severely limits the number of processors that may be networked together in a single system.

Andrew File System ("AFS") is a data caching system that has been specifically designed to provide very good scalability. Now used at many universities, AFS has demonstrated that a few file servers can support thousands of client workstations distributed over a very large geographic area. The major characteristics of AFS that permit its scalability are:

The unit of cached data increases from NFS's 8 k disk block to an entire file. AFS projects complete files from the file server into the client workstations.

Local hard disk drives, required on all AFS client workstations, hold projected file images. Since AFS projects images of complete files, its RAM is quickly occupied by image projections. Therefore, AFS projects complete files onto a client's local hard disk, where they can be locally accessed many times without requiring any more accesses to the network or to the file server.

In addition to projecting file images onto a workstation's hard disk, similar to BSD 4.3, AFS also employs a buffer cache located in the workstation's RAM to store images of blocks of data projected from the file image stored on the workstation's hard disk.

Under AFS, when a program executing on the workstation opens a file, a new file image is projected into the workstation from the file server only if the file is not already present on the workstation's hard disk, or if the file on the file server supersedes the image stored on the workstation's hard disk. Thus, assuming that an image of a file has previously been projected from a network's file server into a workstation, a computer program's request to open that file requires, at a minimum, that the workstation transmit at least one message back to the server to confirm that the image currently stored on its hard disk is the most recent version. This re-validation of a projected image requires a minimum of 25 milliseconds for files that haven't been superseded. If the image of a file stored on the workstation's hard disk has been superseded, then it must be re-projected from the file server into the workstation, a process that may require several seconds. After the file image has been re-validated or re-projected, programs executed by the workstation access it via AFS's local file system and its buffer cache with response comparable to those described above for BSD 4.3.

The consistency of file images projected by AFS start out as being "excellent" for a brief moment, and then steadily degrades over time. File images are always current immediately after the image has been projected from the file server into the client processor, or re-validated by the file server. However, several clients may receive the same file projection at roughly the same time, and then each client may independently begin modifying the file. Each client remains completely unaware of any modifications being made to the file by other clients. As the computer program executed by each client processor closes the file, if the file has been modified the image stored on the processor's hard disk is transmitted back to the server. Each successive transmission from a client back to the file server overwrites the immediately preceding transmission. The version of the file transmitted from the final client processor to the file server is the version that the server will subsequently transmit to client workstations when they attempt to open the file. Thus at the conclusion of such a process the file stored on the file server incorporates only those modifications made by the final workstation to transmit the file, and all modifications made at the other workstations have been lost. While the AFS file server can detect when one workstation's modifications to a file overwrites modifications made to the file by another workstation, there is little the server can do at this point to prevent this loss of data integrity.

AFS, like NFS, fails to project images with absolute consistency. If computer programs don't employ a file locking mechanism external to AFS, the system can support only applications that don't write to shared files. This characteristic of AFS precludes using it for any application that demands high integrity for data written to shared files.

DISCLOSURE OF INVENTION

An object of the present invention is to provide a digital computer system capable of projecting larger data images, over greater distances, at higher bandwidths, and with much better consistency than the existing data caching mechanisms.

Another object of the present invention is to provide a generalized data caching mechanism capable of projecting multiple images of a data structure from its source into sites that are widely distributed across a network.

Another object of the invention is to provide a generalized data caching mechanism in which an image of data always reflects the current state of the source data structure, even when it is being modified concurrently at several remote sites.

Another object of the present invention is to provide a generalized data caching mechanism in which a client process may operate directly upon a projected image as though the image were actually the source data structure.

Another object of the present invention is to provide a generalized data caching mechanism that extends the domain over which data can be transparently shared.

Another object of the present invention is to provide a generalized data caching mechanism that reduces delays in responding to requests for access to data by projecting images of data that may be directly processed by a client site into sites that are "closer" to the requesting client site.

Another object of the present invention is to provide a generalized data caching mechanism that transports data from its source into the projection site(s) efficiently.

Another object of the present invention is to provide a generalized data caching mechanism that anticipates future requests from clients and, when appropriate, projects data toward the client in anticipation of the client's request to access data.

Another object of the present invention is to provide a generalized data caching mechanism that maintains the projected image over an extended period of time so that requests by a client can be repeatedly serviced from the initial projection of data.

Another object of the present invention is to provide a generalized data caching mechanism that employs an efficient consistency mechanism to guarantee absolute consistency between a source of data and all projected images of the data.

Briefly the present invention in its preferred embodiment includes a plurality of digital computers operating as a network. Some of the computers in the network function as Network Distributed Cache ("NDC") sites. Operating in the digital computer at each NDC site is an NDC that includes NDC buffers. The network of digital computers also includes one or more client sites, which may or may not be NDC sites. Each client site presents requests to an NDC to access data that is stored at an NDC site located somewhere within the network. Each item of data that may be requested by the client sites belongs to a named set of data called a dataset. The NDC site storing a particular dataset is called the NDC server terminator site for that particular dataset.

The NDC site that receives requests to access data from the client site is called the NDC client terminator site. A single client site may concurrently request to access different datasets that are respectively stored at different NDC sites. Thus, while there is only a single NDC client terminator site for each client site, simultaneously there may be a plurality of NDC server terminator sites responding to requests from a single client site to access datasets stored at different NDC server terminator sites.

Each NDC in the network of digital computers receives requests to access the data in the named datasets. If this NDC site is an NDC client terminator site for a particular client site, it will receive requests from that client. However, the same NDC site that is an NDC client terminator site for one client, may also receive requests to access data from other NDC sites that may or may not be NDC client terminator sites for other client sites.

An NDC client terminator site, upon receiving the first request to access a particular named dataset from a client site, assigns a data structure called a channel to the request and stores information about the request into the channel. Each channel functions as a conduit through the NDC site for projecting images of data to sites requesting access to the dataset, or, if this NDC site is an NDC client terminator site for a particular request, the channel may store an image of the data in the NDC buffers at this NDC site. In addition to functioning as part of a conduit for transmitting data between an NDC server terminator site and an NDC client terminator site, each channel also stores data that provides a history of access patterns for each client site as well as performance measurements both for client sites and for the NDC server terminator site.

When an NDC site receives a request to access data, regardless of whether the request is from a client site or from another NDC site, the NDC first checks the NDC buffers at this NDC site to determine if a projected image of the requested data is already present in the NDC buffers. If the NDC buffers at this NDC site do not contain a projected image of all data requested from the dataset, and if the NDC site receiving the request is not the NDC server terminator site for the dataset, the NDC of this NDC site transmits a single request for all of the requested data that is not present at this NDC site from this NDC site downstream to another NDC site closer to the NDC server terminator site for the dataset than the present NDC site. If the NDC buffers of this NDC site do not contain a projected image of all data requested from the dataset, and if the NDC site receiving the request is the sever terminator site for the dataset, the NDC of this NDC site accesses the stored dataset to project an image of the requested data into its NDC buffers. The process of checking the NDC buffers to determine if a projected image of the requested data is present there, and if one is not completely present, requesting the additional required data from a downstream NDC site or accessing the stored dataset repeats until the NDC buffers of the site receiving the request contains a projected image of all requested data.

The process of one NDC site requesting data from another downstream NDC site establishes a chain of channels respectively located in each of the NDC sites that provides a conduit for returning the requested data back to the NDC client terminator site. Thus, each successive NDC site in this chain of NDC sites, having obtained a projected image of all the requested data, either by accessing the stored dataset or from its downstream NDC site, returns the data requested from it upstream to the NDC site from which it received the request. This sequence of data returns from one NDC site to its upstream NDC site continues until the requested data arrives at the NDC client terminator site. When the requested data reaches the NDC client terminator site for this request, that NDC site returns the requested data to the client site.

Thus, the network of digital computers, through the NDCs operating in each of the NDC sites in the network, may project images of a stored dataset from an NDC server terminator site to a plurality of client sites in response to requests to access such dataset transmitted from the client sites to NDC client terminator sites. Furthermore, each NDC includes routines called channel daemons that operate in the background in each NDC site. The channel daemons use historical data about accesses to the datasets, that the NDCs store in the channels, to pre-fetch data from the NDC server terminator site to the NDC client terminator site in an attempt to minimize any delay between the receipt of a request to access data from the client site and the response to that request by the NDC client terminator site.

In addition to projecting images of a stored dataset, the NDCs detect a condition for a dataset, called a concurrent write sharing ("CWS") condition, whenever two or more client sites concurrently access a dataset, and one or more of the client sites attempts to write the dataset. If a CWS condition occurs, one of the NDC sites declares itself to be a consistency control site ("CCS") for the dataset, and imposes restrictions on the operation of other NDC sites upstream from the CCS. The operating restrictions that the CCS imposes upon the upstream NDC sites guarantee client sites throughout the network of digital computers the same level of file consistency the client sites would have if all the client sites operated on the same computer. That is, the operating conditions that the CCS imposes ensure that modifications made to a dataset by one client site are reflected in the subsequent images of that dataset projected to other client sites no matter how far the client site modifying the dataset is from the client site that subsequently requests to access the dataset.

These and other features, objects and advantages will be understood or apparent to those of ordinary skill in the art from the following detailed description of the preferred embodiment as illustrated in the various drawing figures.

BRIEF DESCRIPTION OF DRAWINGS

FIG. 4, made up of FIGS. 4A and 4B, is a computer program listing written in the C programming language setting forth a data structure of a channel and of a subchannel included in the channel that are used by the NDC of FIG. 3;

FIG. 5 is a table written in the C programming language that specifies the values of various flags used by the channel illustrated in FIG. 4;

FIG. 6 is a table written in the C programming language that defines the values of various flags used in specifying the state of channels;

FIG. 9 is a table written in the C programming language defining the message type codes for the various different Data Transfer Protocol ("DTP") messages that can be transmitted between NDC sites;

FIG. 10, made up of FIGS. 10A and 10B, is a definition written in the C programming language of the data structure for DTP messages;

FIG. 11, made up of FIGS. 11A, 11B, 11C, 11D, 11E, 11F, 11G, 11H, 11I, are definitions written in the C programming language for various data substructures incorporated into the structures of FIGS. 4 and 10;

FIG. 12 is a definition written in the C programming language of the data structure that is used in chaining together DTP messages;

FIG. 13, made up of FIGS. 13A and 13B, is a definition written in the C programming language for a data structure that contains the channel's metadata;

BEST MODE FOR CARRYING OUT THE INVENTION

Figure 1:
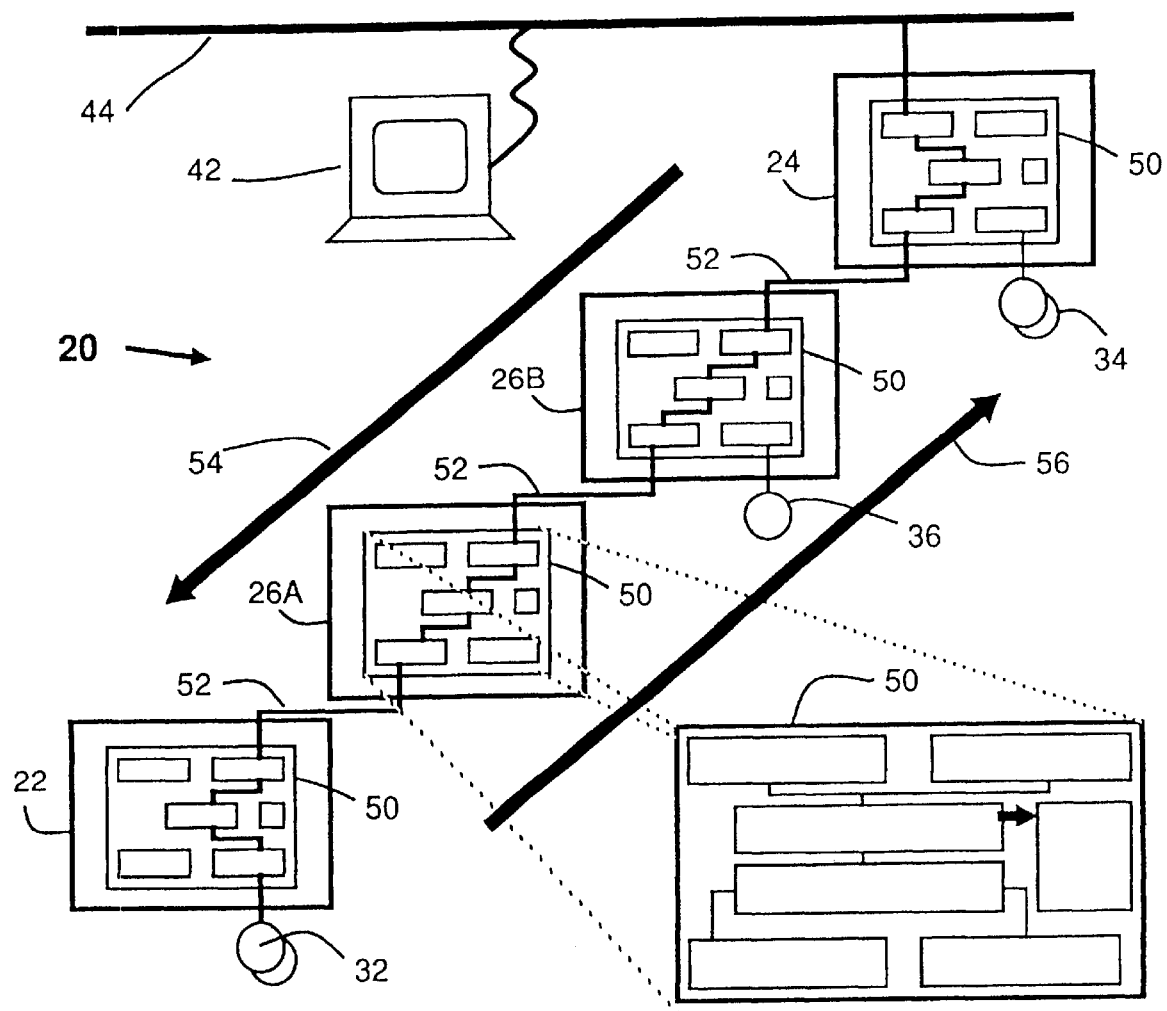
FIG. 1 is a block diagram depicting a networked, multi-processor digital computer system that includes an NDC server terminator site, an NDC client terminator site, and a plurality of intermediate NDC sites, each NDC site in the networked computer system operating to permit the NDC client terminator site to access data stored at the NDC server terminator site.

FIG. 1 is a block diagram depicting a networked, multi-processor digital computer system referred to by the general reference character 20. The digital computer system 20 includes a Network Distributed Cache ("NDC®") server site 22, an NDC client site 24, and a plurality of intermediate NDC sites 26A and 26B. Each of the NDC sites 22, 24, 26A and 26B in the digital computer system 20 includes a processor and RAM, neither of which are illustrated in FIG. 1. Furthermore, the NDC server site 22 includes a hard disk 32 for storing data that may be accessed by the client site 24. The NDC client site 24 and the intermediate NDC site 26B both include their own respective hard disks 34 and 36. A client workstation 42 communicates with the NDC client site 24 via an Ethernet Local Area Network ("LAN") 44 in accordance with a network protocol such as that of the NFS systems identified above.

Each of the NDC sites 22, 24, 26A and 26B in the networked computer system 20 includes an NDC 50, an enlarged version of which is depicted for intermediate site 26A. The NDCs 50 in each of the NDC sites 22, 24, 26A and 26B include a set of computer programs and a data cache located in the RAM of the NDC sites 22, 24, 26A and 26B. The NDCs 50 together with Data Transfer Protocol ("DTP®") messages 52, illustrated in FIG. 1 by the lines joining pairs of NDCs 50, provide a data communication network by which the client workstation 42 may access data on the hard disk 32 via the NDC sites 24, 26B, 26A and 22.

The NDCs 50 operate on a data structure called a "dataset." Datasets are named sequences of bytes of data that are addressed by:

a server-id that identifies the NDC server site where source data is located, such as NDC server site 22; and a dataset-id that identifies a particular item of source data stored at that site, usually on a hard disk, such as the hard disk 32 of the NDC server site 22.

The dataset-id may specify a file on the hard disk 32 of the NDC server site 22, in which case it would likely be a compound identifier (filesystem id, file id), or it may specify any other contiguous byte sequence that the NDC server site 22 is capable of interpreting and is willing to transmit to the NDC client site 24. For example, a dataset could be ten pages from the RAM of the NDC server site 22. Such a ten page segment from the RAM of the NDC server site 22 might itself be specified with a filesystem-id that identifies virtual memory and a file-id that denoted the starting page number within the virtual memory.

The NDC client site 24 requests access to data from the NDC server site 22 using an NDC_LOAD message specifying whether the type of activity being performed on the dataset at the NDC client site 24 is a read or a write operation. The range of data requested with an NDC_LOAD message specifies the byte sequences within the named dataset that are being accessed by the NDC client site 24. A single request by the NDC client site 24 may specify several disparate byte sequences, with no restriction on the size of each sequence other than it be discontiguous from all other sequences specified in the same request. Thus, each request to access data by the NDC client site 24 contains a series of range specifications, each one of which is a list of offset/length pairs that identify individual contiguous byte sequences within the named dataset.

Topology of an NDC Network

An NDC network, such as that illustrated in FIG. 1 having NDC sites 22, 24, 26A and 26B, includes:

1. all nodes in a network of processors that are configured to participate as NDC sites; and 2. the DTP messages 52 that bind together NDC sites, such as NDC sites 22, 24, 26A and 26B.

Any node in a network of processors that possesses a megabyte or more of surplus RAM may be configured as an NDC site. NDC sites communicate with each other via the DTP messages 52 in a manner that is completely compatible with non-NDC sites.

FIG. 1 depicts a series of NDC sites 22, 24, 26A and 26B linked together by the DTP messages 52 that form a chain connecting the client workstation 42 to the NDC server site 22. The NDC chain may be analogized to an electrical transmission line. The transmission line of the NDC chain is terminated at both ends, i.e., by the NDC server site 22 and by the NDC client site 24. Thus, the NDC server site 22 may be referred to as an NDC server terminator site for the NDC chain, and the NDC client site 24 may be referred to as an NDC client terminator site for the NDC chain. An NDC server terminator site 22 will always be the node in the network of processors that "owns" the source data structure. The other end of the NDC chain, the NDC client terminator site 24, is the NDC site that receives requests from the client workstation 42 to access data on the NDC server site 22.

Data being written to the hard disk 32 at the NDC server site 22 by the client workstation 42 flows in a "downstream"

direction indicated by a downstream arrow 54. Data being loaded by the client workstation 42 from the hard disk 32 at the NDC server site 22 is pumped "upstream" through the NDC chain in the direction indicated by an upstream arrow 56 until it reaches the NDC client site 24. When data reaches the NDC client site 24, it together with metadata is reformatted into a reply message in accordance with the appropriate network protocol such as NFS, and sent back to the client workstation 42. NDC sites are frequently referred to as being either upstream or downstream of another NDC site. The downstream NDC site 22, 26A or 26B must be aware of the types of activities being performed at its upstream NDC sites 26A, 26B or 24 at all times.

Figure 3:
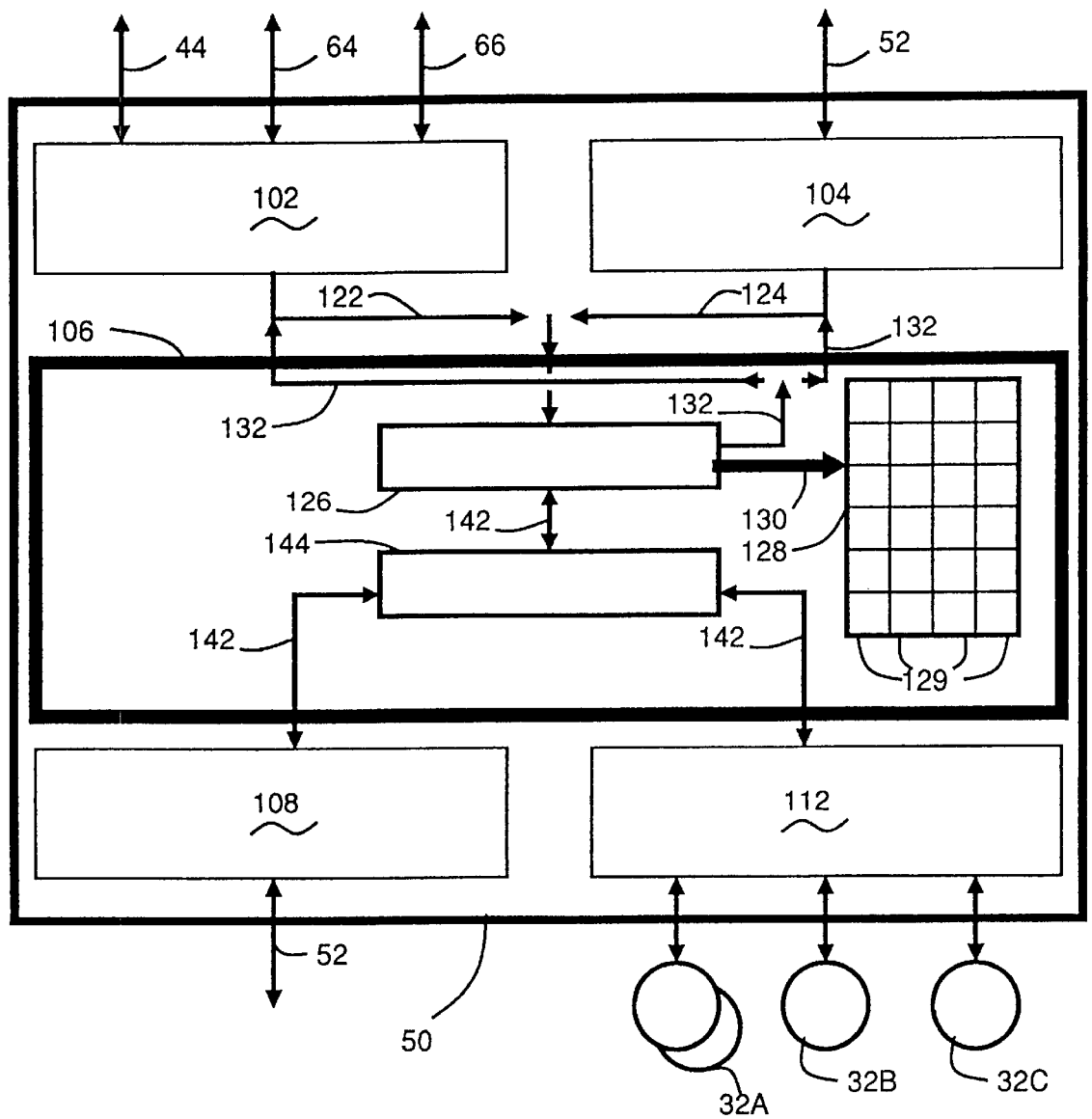
FIG. 3 is a block diagram depicting a structure of the NDC included in each NDC site of FIG. 1 including the NDC's buffers.
Figure 7:
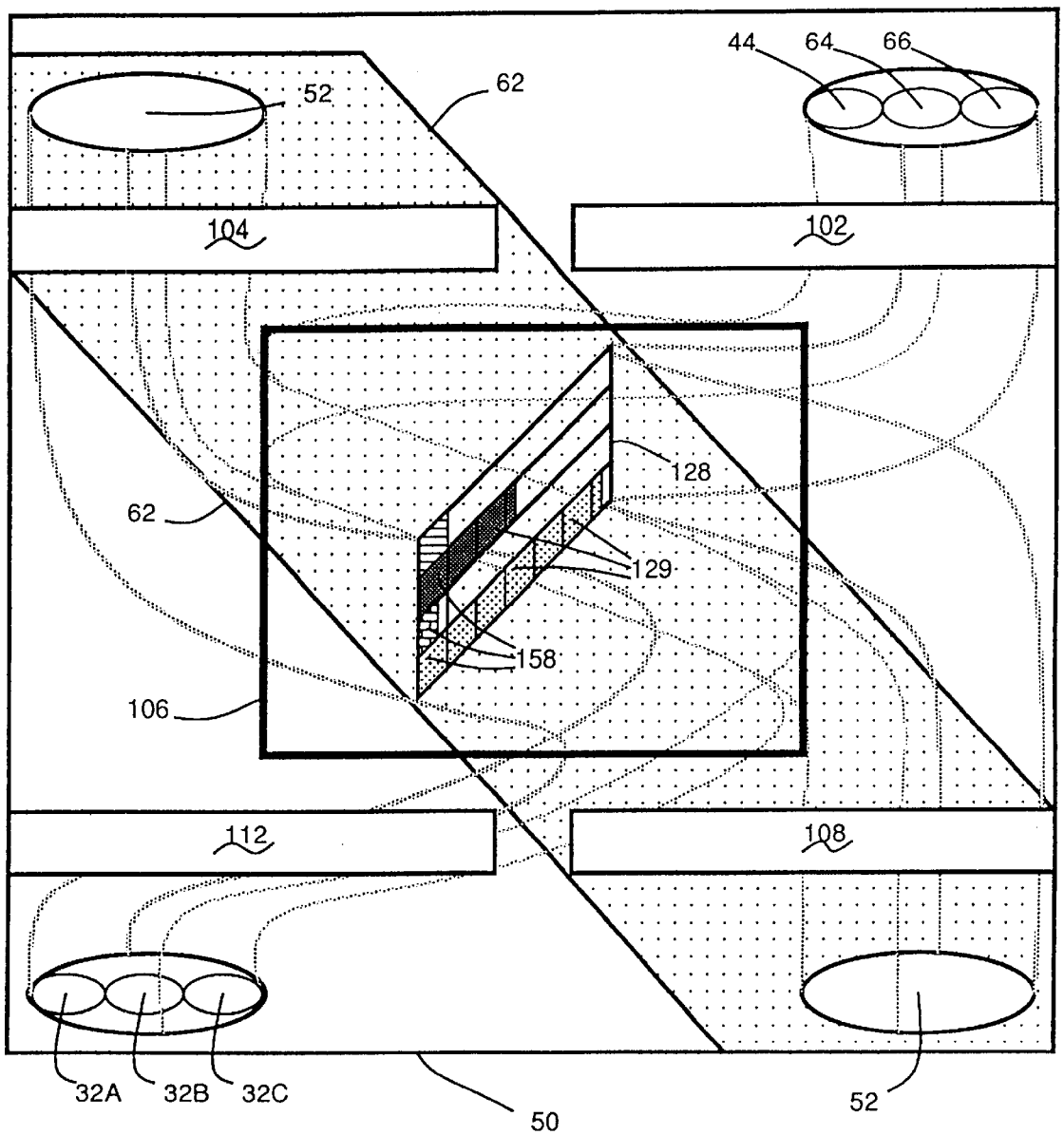
FIG. 7 is a block diagram illustrating projected images of a single dataset being transferred through the NDC site depicted in FIG. 3 and illustrating the storage of various segments of the dataset in the NDC buffers.

In the network depicted in FIG. 1, a single request by the client workstation 42 to read data stored on the hard disk 32 is serviced in the following manner:

1. The request flows across the Ethernet LAN 44 to the NDC client site 24 which serves as a gateway to the NDC chain. Within the NDC client site 24, an NDC client intercept routine 102, illustrated in FIGS. 3 and 7, inspects the request. If the request is an NFS request and if the request is directed at any NDC site 24, 26A, 26B, or 22 for which the NDC client site 24 is a gateway, then the request is intercepted by the NDC client intercept routine 102.
2. The NDC client intercept routine 102 converts the NFS request into a DTP request, and then submits the request to an NDC core 106.
3. The NDC core 106 in the NDC client site 24 receives the request and checks its NDC cache to determine if the requested data is already present there. If all data is present in the NDC cache of the NDC client site 24, the NDC 50 will copy pointers to the data into a reply message structure and immediately respond to the calling NDC client intercept routine 102.
4. If all the requested data isn't present in the NDC cache of the NDC client site 24, then the NDC 50 will access any missing data elsewhere. If the NDC site 24 were a server terminator site, then the NDC 50 would access the filesystem for the hard disk 34 upon which the data would reside.
5. Since the NDC client site 24 is a client terminator site rather than a server terminator site, the NDC 50 must request the data it needs from the next downstream NDC site, i.e., intermediate NDC site 26B in the example depicted in FIG. 1. Under this circumstance, DTP client interface routines 108, illustrated in FIGS. 3 and 7, are invoked to request from the intermediate NDC site 26B whatever additional data the NDC client site 24 needs to respond to the current request.
6. A DTP server interface routine 104, illustrated in FIGS. 3 and 7, at the downstream intermediate NDC site 26B receives the request from the NDC 50 of the NDC client site 24 and processes it according to steps 3, 4, and 5 above. The preceding sequence repeats for each of the NDC sites 24, 26B, 26A and 22 in the NDC chain until the request reaches the server terminator, i.e., NDC server site 22 in the example depicted in FIG. 1, or until the request reaches an NDC site that has all the data that is being requested of it.
7. When the NDC server terminator site 22 receives the request, its NDC 50 accesses the source data structure. If the source data structure resides on a hard disk, the appropriate file system code (UFS, DOS, etc.) is invoked to retrieve the data from the hard disk 32.
8. When the file system code on the NDC server site 22 returns the data from the hard disk 32, a response chain begins whereby each downstream site successively responds upstream to its client, e.g. NDC server site 22 responds to the request from intermediate NDC site 26A, intermediate NDC site 26A responds to the request from intermediate NDC site 26B, etc.
9. Eventually, the response percolates up through the sites 22, 26A, and 26B to the NDC client terminator site 24.
10. The NDC 50 on the NDC client site 24 returns to the calling NDC client intercept routine 102, which then packages the returned data and metadata into an appropriate network protocol format, such as that for an NFS reply, and sends the data and metadata back to the client workstation 42.

The NDC client intercept routines 102 are responsible for performing all conversions required between any supported native protocol, e.g. NFS, Server Message Block ("SMB"), Novelle Netware®, etc., and the DTP messages 52 employed for communicating among the NDCs 50 making up the NDC chain. The conversion between each native protocol and the DTP messages 52 must be so thorough that client workstations, such as the client workstation 42, are unable to distinguish any difference in operation between an NDC 50 functioning as a server to that workstation and that workstation's "native" server.

Figure 2:
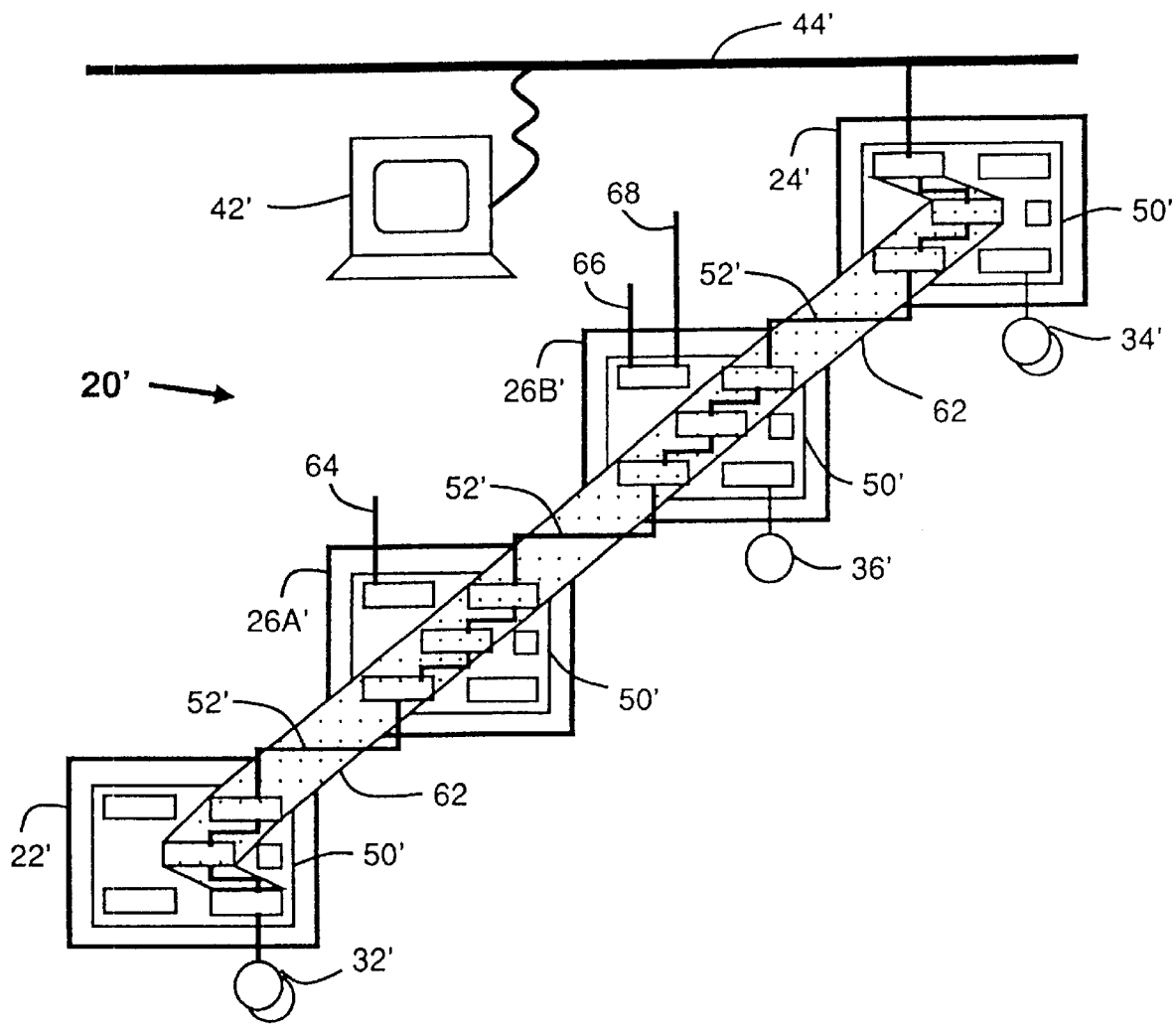
FIG. 2 is a block diagram that provides another way of illustrating the networked, multi-processor digital computer system of FIG. 1.

An alternative way of visualizing the operation of the NDCs 50' is illustrated in FIG. 2. Those elements depicted in FIG. 2 that are common to the digital computer system 20 depicted in FIG. 1 bear the same reference numeral distinguished by a prime ("'") designation. The NDCs 50' in the sites 22', 26A', 26B' and 24' provide a very high speed data conduit 62 connecting the client intercept routines 102 of the NDC client site 24' to file system interface routines 112 of the NDC server site 22', illustrated in FIGS. 3 and 7. Client workstations, using their own native protocols, may plug into the data conduit 62 at each of the NDC sites 22, 26A, 26B and 24 via the NDC's client intercept routines 102 in each of the NDC sites 22, 26A, 26B and 24. Accordingly, the NDC 50 of the intermediate NDC site 26A may interface into a Novelle Netware network 64. Similarly, the NDC 50 of the intermediate NDC site 26B may interface into a SMB network 66, and into an NFS network 68. If an NDC site 24, 26B, 26A or 22 is both the client terminator site and the server terminator site for a request to access data, then the NDC data conduit 62 is contained entirely within that NDC site 24, 26B, 26A or 22.

After an NDC 50' intercepts a request from a client workstation on one of the networks 44', 64, 66 or 68 and converts it into the DTP messages 52', the request travels through the data conduit 62 until all the data has been located. If a request is a client's first for a particular dataset, the DTP messages 52' interconnecting each pair of NDCs 50' form the data conduit 62 just in advance of a request's passage. If a request reaches the NDC server terminator site 22', the NDC 50' directs it to the appropriate file system on the NDC server terminator site 22'. Each NDC site 22' may support several different types of file systems for hard disks attached thereto such as the hard disks 32', 34', and 36'.

After the file system at the NDC server terminator site 22' returns the requested data to its NDC 50', the NDC 50' passes the reply data and metadata back up through each NDC site 26A' and 26B' until it reaches the client terminator 24'. At the client terminator 24', the NDC routine originally called by the NDC client intercept routine 102 returns back to that routine. The NDC client intercept routine 102 then reformats the data and metadata into an appropriately formatted reply message and dispatches that message back to the client workstation 42'.

Four components of the NDC 50' support the data conduit 62:

The resource management mechanisms of the NDC client terminator site that measure the rate at which its client workstations consume data and also notes whether the data is being accessed sequentially. Each NDC 50' also measures the rate of replenishment from downstream NDC sites.

The pre-fetch mechanism that enables each of the NDC sites 22', 24', 26A' and 26B' to operate autonomously, thereby reducing network traffic substantially and enabling each NDC site to directly respond to requests from client workstations or upstream NDC sites.

The DTP message 52' which allows multiple data segments of any length to be transferred with a single request.

The consistency control mechanism that very efficiently monitors and maintains the integrity of all projections of data from the NDC server terminator site 22' to the NDC client terminator site 24'.

NDC 50

As depicted in FIGS. 3 and 7, the NDC 50 includes five major components:

client intercept routines 102;
DTP server interface routines 104;
NDC core 106;
DTP client interface routines 108; and
file system interface routines 112.

Routines included in the NDC core 106 implement the function of the NDC 50. The other routines 102, 104, 108 and 112 supply data to and/or receive data from the NDC core 106. The main building block of the NDC core 106 is a data structure called a channel 116 illustrated in FIG. 4. The NDC core 106 typically includes anywhere from 2,000 to 100,000 channels 116, depending on the size of the NDC site 22, 24, 26A or 26B. The RAM in each NDC site 22, 24, 26A or 26B that is occupied by the channels 116 is allocated to the NDC 50 upon initialization of the NDC site. Each channel 116 is a conduit for projecting images of a dataset further upstream, or, if the channel 116 for the dataset is located in the client terminator site 24, it also provides the space into which the data images are projected. The routines of the NDC core 106, described in greater detail below, are responsible for maintaining data images within the NDC site 22, 24, 26A or 26B or expediting their passage through the NDC site 22, 24, 26A or 26B.

FIG. 5 is a table written in the C programming language that specifies the values of various flags used in controlling the operation of the NDC sites 22, 26A, 26B and 24. FIG. 6 is a table written in the C programming language that lists the values of various flags used in specifying the state of channels 116. Depending upon the operation of the NDC 50, the values of various ones of the flags listed in FIGS. 5 and 6 will be assigned to the channels 116 or other data structures included in the NDC 50.

FIGS. 3 and 7 illustrate the client intercept routines 102, that are needed only at NDC sites which may receive requests for data in a protocol other than DTP, e.g., a request in NFS protocol, SMB protocol, or another protocol, are completely responsible for all conversions necessary to interface a projected dataset image to a request that has been submitted via any of the industry standard protocols supported at the NDC site 22, 24, 26A or 26B.

NDC sites 22, 24, 26A and 26B are always equipped with both the DTP server interface routines 104 and the DTP client interface routines 108. NDC sites 22, 24, 26A and 26B communicate via the DTP messages 52 which move raw data, independent not only of any protocol such as NFS, SMB, or Netware, but also of any structure other than byte sequences within an identified dataset. The DTP messages 52 enable a single request to specify multiple segments of a named set of data as the targets of a single operation. Each segment specified in a DTP request is a sequence of consecutive bytes of data of any length.

The file system interface routines 112 are included in the NDC 50 only at NDC file server sites, such as the NDC server site 22. The file system interface routines 112 route data between the disk drives 32A, 32B and 32C illustrated in FIG. 3 and the NDC data conduit 62 that extends from the NDC server terminator site 22 to the NDC client terminator site 24.

Another illustration of the NDC 50, depicted in FIG. 7, portrays an NDC data conduit 62 passing through an NDC site, such as the NDC sites 22, 24, 26A or 26B. The NDC data conduit 62, stretching from the NDC server terminator site 22 to the NDC client terminator site 24, is composed of the channels 116 at each NDC site 22, 24, 26A or 26B that have bound together to form an expressway for transporting data between the NDC server terminator site 22 and the NDC client terminator site 24. Each channel 116 in the chain of NDC sites 22, 24, 26A and 26B is capable of capturing and maintaining images of data that pass through it, unless a concurrent write sharing ("CWS") condition exists for that data. However, whether a channel 116 opts to capture an image of data passing through the NDC site 22, 24, 26A or 26B depends heavily upon the location of the channel 116 in the NDC data conduit 62. There are three possible locations for a channel 116 in the NDC data conduit 62.

First, a channel 116 may be located at the NDC client terminator site 24 in which case images of data are projected and sustained within the NDC site by the routines in the NDC core 106 with substantial assistance from the DTP client interface routines 108. The NDC 50 at the NDC client terminator site 24 services requests from clients, such as the client workstation 42, directly from projected images via the client intercept routines 102. Most image projections are sustained only in client terminator sites, such as thee NDC client terminator site 24.

Second, a channel 116 may be located at an intermediate NDC site, such as the intermediate NDC sites 26A or 26B, in which case images are usually projected within the NDC site only for the minimum time required for the data to traverse the NDC site. However, if a CWS condition exists for a channel 116, the channel 116 at an intermediate NDC site 26A or 26B that controls the consistency of the data will capture and sustain images that otherwise would have been projected further upstream to the NDC client terminator site 24. The NDC 50 at an intermediate NDC site 26A or 26B employs the DTP server interface routines 104, the routines of the NDC core 106, and the DTP client interface routines 108 to provide these functions.

Third, a channel 116 may be located at a server terminator, such as the NDC server terminator site 22, in which case images are usually projected within the NDC site only for the minimum time required for the data to traverse the site. The NDC 50 at an NDC server terminator site 22 employs the DTP server interface routines 104, the routines in the NDC core 106, and the file system interface routines 112. NDC server terminator sites operate in most respects similar to a intermediate NDC site. However, if the NDC server terminator site 22 lacks requested data, it invokes one of the file system interface routines 112 instead of a DTP client interface routines 108 to obtain the needed data.

If the client intercept routines 102 of the NDC 50 receives a request to access data from a client, such as the client workstation 42, it prepares a DTP request indicated by the arrow 122 in FIG. 3. If the DTP server interface routines 104 of the NDC 50 receives a request from an upstream NDC 50, it prepares a DTP request indicated by the arrow 124 in FIG. 3. DTP requests 122 and 124 are presented to the NDC core 106. Within the NDC core 106, the DTP request 122 or 124 cause a buffer search routine 126 to search a pool 128 of NDC buffers 129, as indicated by the arrow 130 in FIG. 3, to determine if all the data requested by either the routines 102 or 104 is present in the NDC buffers 129 of this NDC 50. (The channel 116 together with the NDC buffers 129 assigned to the channel 116 may be referred to collectively as the NDC cache.) If all the requested data is present in the NDC buffers 129, the buffer search routine 126 prepares a DTP response, indicated by the arrow 132 in FIG. 3, that responds to the request 122 or 124, and the NDC core 106 appropriately returns the DTP response 132, containing both data and metadata, either to the client intercept routines 102 or to the DTP server interface routines 104 depending upon which routine 102 or 104 submitted the request 122 or 124. If the client intercept routine 102 receives DTP response 132, before the client intercept routine 102 returns the requested data and metadata to the client workstation 42 it reformats the response from DTP to the protocol in which the client workstation 42 requested access to the dataset, e.g. into NFS, SMB, Netware or any other protocol.

If all the requested data is not present in the NDC buffers 129, then the buffer search routine 126 prepares a DTP downstream request, indicated by the arrow 142 in FIG. 3, for only that data which is not present in the NDC buffers 129. A request director routine 144 then directs the DTP request 142 to the DTP client interface routines 108, if this NDC 50 is not located in the NDC server terminator site 22, or to the file system interface routines 112, if this NDC 50 is located in the NDC server terminator site 22. After the DTP client interface routines 108 obtains the requested data together with its metadata from a downstream NDC site 22, 26A, etc. or the file system interface routines 112 obtains the data from the file system of this NDC client terminator site 24, the data is stored into the NDC buffers 129 and the buffer search routine 126 returns the data and metadata either to the client intercept routines 102 or to the DTP server interface routines 104 as described above.

Channels 116

The NDC 50 employs channels 116 to provide a data pathway through each NDC site 22, 24, 26A and 26B, and to provide a structure for storing a history of patterns of accessing each dataset for each client, such as the client workstation 42, as well as performance measurements on both clients and the NDC server terminator site 22. Using this information, the NDC 50 is able to anticipate future demand by the client, such as the client workstation 42, and the latencies that will be incurred on any request that must be directed downstream toward the NDC server terminator site 22.

Channels 116 are the main data structure making up the NDC 50. Each channel 116 enables an image of data to be projected into the site. For small datasets (144 k or less), the image will often reflect the entire dataset. For larger datasets, the image may consist of one or more partial images of the dataset. A dataset may be projected concurrently into several NDC sites 22, 24, 26A and 26B. In all NDC sites 22, 24, 26A and 26B, at all times, the projected image will exactly match the current state of the dataset. A channel 116 belonging to the NDC 50 at either of the intermediate NDC sites 26A or 26B may be referred to as an "intermediate channel."

A channel 116 may exist within an NDC 50 without containing any projections of the data with which it is associated. This would be the normal state of a channel 116 that's participating in the CWS of data.

A CWS condition exists if multiple clients, such at the client workstation 42, are simultaneously accessing the same dataset, and at least one of them is writing the dataset. In this mode of operation, referred to as concurrent mode, images are projected into an NDC site 22, 24, 26A or 26B for only a very brief period between the receipt of the reply from a downstream NDC site, e.g., the receipt by intermediate NDC site 26B of a reply from intermediate NDC site 26A, and the forwarding of the reply upstream, e.g. the forwarding of a reply from intermediate NDC site 26B to NDC client terminator site 24, or the forwarding of the reply into the client intercept routines 102, if the site is the NDC client terminator site 24.

Channels 116 that don't maintain a projected image of data when a CWS condition exists still serve an important function in the overall operation of the digital computer system 20. In addition to data, each channel 116 stores other information that:

measures the rate at which the client, e.g. the client workstation 42, consumes data;

monitors the client's access pattern, i.e. random or sequential;

measures the response latencies for downstream services such as requesting access to data from the NDC server terminator site 22; and monitors the activities of upstream sites to detect the presence of a CWS condition.

Thus, each channel 116 is much more than just a cache for storing an image of the dataset to which it's connected. The channel 116 contains all of the information necessary to maintain the consistency of the projected images, and to maintain high performance through the efficient allocation of resources. The channel 116 is the basic structure through which both control and data information traverse each NDC site 22, 24, 26A and 26B, and is therefore essential for processing any request. The following sections describe more completely the structure and use of channels 116.

Structure of Channel 116

FIG. 4 discloses the presently preferred structure for the channel 116 in the "C" programming language. The salient features of FIG. 4 are:

each channel 116 can be linked into a hash list;

each channel 116 can be linked into a channel free list;

each channel 116 contains a considerable amount of state information, including:

the dataset handle (identifies: server, filesystem, file) for data with which the channel 116 is associated;

a cached copy of the dataset's attributes;

if the dataset is a directory, a pointer to a cached image of the directory, already formatted for transmission upstream;

an indicator specifying how far write data must be flushed downstream before responding back to the client;

pointers to the current request message that's being processed and any currently outstanding upstream or downstream messages that have been issued by the NDC site 22, 24, 26A or 26B in the process of executing the request;

a pointer to a list of NDC_UPSTREAM_SITE structures that keep track of all upstream activity;

the address of the next level downstream site; and measurements on the channel data rate, dataset data rate, and a count of the number of requests that exactly spliced onto the end of a previous request; and each channel 116 contains a single instance of a structure for a subchannel 152, illustrated in FIG. 4B, which contains pointers to any NDC buffers 129, illustrated in FIG. 3, into which any portion of the dataset is currently being projected.

Each channel 116, including its built-in subchannel 152, occupies about 500 bytes of RAM. The RAM occupied by any NDC buffer 129, illustrated in FIG. 3, that hold data image projections is in addition to the amount of RAM occupied by each channel 116. However, pointers to the NDC buffers 129 are included in the RAM occupied by each channel 116. Also, all NDC metadata, i.e., information about the named set of data such as file attributes (attr), server name (server_pid), filesystem id (NDC_FH.fsid), and file id (NDC_FH.fid) illustrated in FIG. 4, is projected directly into the channel structure (NDC_STATS and NDC_ATTR).

The channel 116 may contain complete or partial images of a file or of a directory. The channel 116 is capable of projecting an image of a complete file from the NDC server terminator site 22 into the NDC client terminator site 24, even if the file is very large. However, issues of shared resource management will usually preclude projecting large data images from the NDC server terminator site 22 into the NDC client terminator site 24.

Any image of data that is projected from the NDC server terminator site 22 into the NDC client terminator site 24 is always valid and may be directly operated upon by the client workstation 42 either for reading or for writing without requesting further service from downstream NDC sites 26B, 26A or 22. If the client workstation 42 modifies the data, no matter how remote the client workstation 42 may be located from the NDC server terminator site 22, any projected image segments of the data that has just been modified at any other NDC site will be removed before processing the next request for that data at that NDC site.

Subchannels 152

Figure 8:
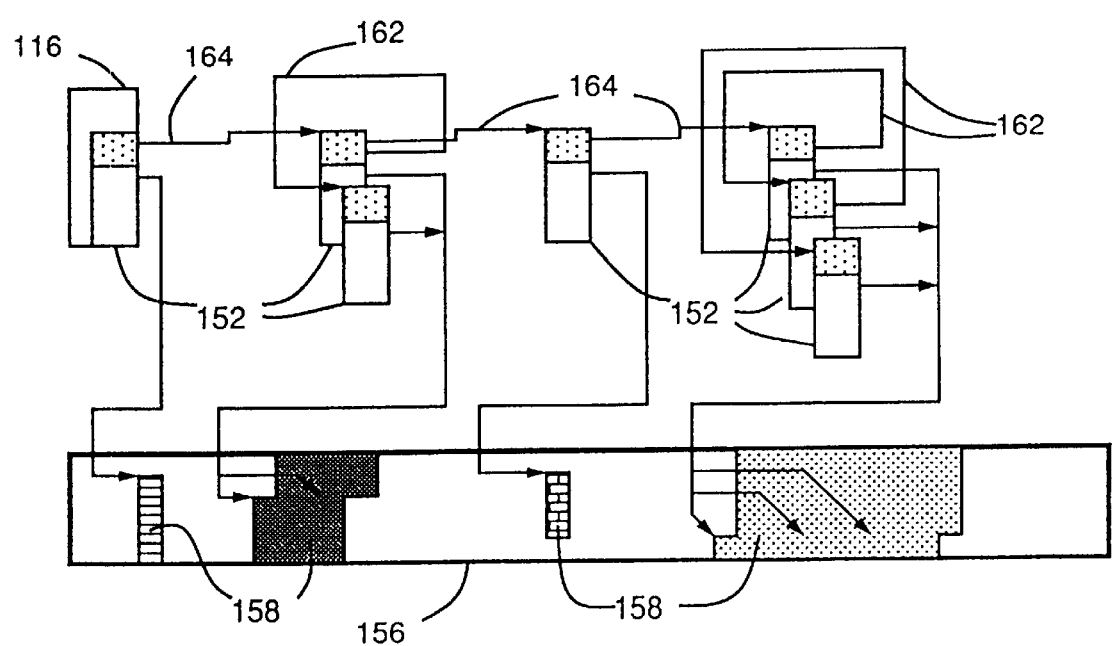
FIG. 8 is a block diagram depicting a channel and a plurality of subchannels operating to access various segments of a dataset that have been projected into the NDC buffers illustrated in FIGS. 3 and 7.

A channel 116 may include one or more channel structures. A channel 116 that includes only a single channel structure, such as that illustrated in FIG. 4, is referred to as a simple channel 116. A simple channel 116 can project a single image of limited size. However, as illustrated in FIG. 8, through the use of a subchannel 152, a simple channel 116 may be extended thus permitting it to project from a file 156 a segment 158 of contiguous data that is larger than that which can be projected using only a simple channel 116. A channel structure made up of a channel 116 and one or more subchannels 152, illustrated in FIG. 8, may be referred to as a complex channel 116. As described previously and illustrated in FIG. 8, the NDC 50 always projects images of data from a file 156 in segment 158. Each segment 158 illustrated in FIG. 8 is a series of consecutive bytes from the file 156 specified by offset and seg_length variables stored in the structure of a subchannel 152. Moreover, the channel 116 may also include additional subchannels 152 that project discontiguous segments 158 from the file 156. An image projection that is larger than that accommodated by the single subchannel 152 included in a channel 116 requires that the subchannel 152 be extended thereby creating a complex channel 116. Multiple subchannels 152 are linked via the extent pointer (*ext) 162 of the subchannel 152 to form a logical subchannel that can project an image of any size.

Multiple Image Projections

Each channel 116 may also support several different, non-overlapping image projections simultaneously. Each projection requires one logical subchannel. The next subchannel pointer (*next) 164 of each subchannel 152 links together the logical subchannels.

The ability to project multiple images of the same dataset facilitates simultaneously servicing several clients, such as the client workstation 42. Small datasets are usually completely projected by a single channel 116, and this single projection is shareable. If several clients, such as the client workstation 42, access a large dataset sequentially but are each operating in different areas of the dataset, then projections are generated as required to provide local images of the segments 158 being accessed by the different client workstations such as the client workstation 42. Furthermore, the NDC 50 may project several images, each image being of a discontiguous segment 158 from a single file, for a single client if that client is performing a significant amount of sequential processing in several different areas of a large file. Under such circumstances, each segment 158 from the file 156 would have its own projection.

If a projected image grows or shifts to such an extent that it would abut or overlap another image, the NDC 50 coalesces both images into a single segment 158. Thus, segments 158 are always separated from each other by at least one byte of non-projected data.

Another characteristic of a channel 116 having multiple projections is that all of its subchannels 152 are ordered in increasing offset into the dataset.

The channel 116, the subchannel 152, and subchannel 152 extending a subchannel 152 all use the same structure that is disclosed in FIG. 4. When the structure disclosed in FIG. 4 is used as a subchannel 152 or to extend a subchannel 152, some fields remain unused. Although this wastes some space in RAM, it enables complex channels 116 to grow on demand without requiring three different resources and the mechanisms to allocate and control them.

Channel Free List

Channels 116 that are not in active use, even though they probably are still valid and have connections to datasets complete with projections of both data and NDC metadata, are placed on the channel free list. All channels 116 that are not being used for servicing a request are placed on the channel free list. Conversely, any channel 116 that is currently engaged in responding to a request will not be on the channel free list.

The channel free list is formed by linking all free channels together via their av_forw and av_back pointers. The channels 116 on the channel free list are ordered according to the length of time since their last usage. Whenever a channel 116 is used, it is removed from the channel free list and marked C_BUSY. After the process that claimed the channel 116 has completely finished its task, C_BUSY is cleared and the channel 116 is linked onto the end of the channel free list. Repeated use of this simple process results in the "time since last use" ordering of the channel free list.

When the NDC 50 receives a new request specifying a dataset for which there is currently no channel 116 connection, a new channel 116 is allocated and assigned to serve as the pathway to the dataset. When a new channel 116 is required, the least recently used channel 116 is removed from the head of the channel free list, marked as C_BUSY and invalid, all state associated with the prior request is discarded, and the channel 116 is re-allocated to the requesting process.

There are two caveats to the preceding procedure:

A channel 116 that has just been removed from the head of the channel free list may contain modified data or NDC metadata that must be flushed downstream to the NDC server terminator site 22. The presence of a C_DELAYED_WRITE flag in the channel 116 indicates the existence of this condition.

A channel 116 may be a complex channel 116 which must be broken up since, initially, all channels 116 begin as simple channels 116 and may grow to become complex channels 116.

The NDC 50 includes routines called channel daemons that perform general maintenance functions on the channel 116 that are needed to keep each NDC site 22, 24, 26A and 26B at a peak level of readiness. The channel daemons perform their function in background mode when the NDC 50 is not busy responding to requests to access data. The NDC 50 invokes the appropriate channel daemon whenever there are no requests to be serviced. During periods of peak load, when requests to access data are pending, the NDC 50 suspends operation of the channel daemons, and the tasks normally performed by the channel daemons are, instead, performed directly by the request processing routines themselves.

Channel daemons:

maintain the channel free list, schedule the loading and unloading of channels 116, and load and unload channels 116.

There are specialized channel daemons that perform each of these functions. A Reaper daemon routine maintains the channel free list, a Loadmaster daemon routine prioritizes the demands of competing channels 116, and supervisor daemon routines service channels 116 that they receive from the Loadmaster daemon routine to ensure that the channels 116 are prepared to immediately respond to the next incoming request to access data.

The process of claiming a channel 116 from the channel free list occurs while the NDC 50 is servicing a request. Any time required to handle either of the two caveats identified above increases the time required to respond to the request. When there are several NDC sites 22, 24, 26A and/or 26B between the client workstation 42 and the NDC server terminator site 22, the delay at each site may compound until the time to respond to the request from the client workstation 42 becomes unacceptable. To minimize such delays, it is important to reduce the time spent in claiming a channel 116 from the channel free list.

To reduce the time required to claim a channel 116 from the channel free list, the NDC 50 implements the channel free list as five lists that are linked together. The five channel free lists are:

CQ_EMPTY

This is a list of channels 116 that have no NDC buffers 129 assigned. Channels 116 on this list may still contain dataset attributes that are still valid. The channels 116 are those that have been used least recently, and are, therefore, the prime candidates for re-assignment if a request to access data requires a new channel.

CQ_CLEAN

This is a list of channels 116 that have NDC buffers 129 assigned to them. BD_DIRTY_DATA may not be set on any NDC buffer 129 assigned to a channel 116 that is on this list. Channels that are full of useless data, e.g., data from a request that experienced a fatal disk read error, are marked with C_ERROR, and such channels 116 are enqueued at the front of the CQ_CLEAN list.

Channels 116 that have percolated all the way up through a CQ_SERVICE list are enqueued at the back of the CQ_CLEAN list as soon as their data has been flushed downstream toward the NDC server terminator site 22. Data within channels 116 that are on the CQ_CLEAN list is still valid, and may be used if it is requested before the channel 116 percolates its way up through the CQ_CLEAN list.

CQ_READY

This is a list of channels 116 that are ready to respond immediately to the next anticipated request to access data from the client workstation 42. Channels 116 that are experiencing requests to access the dataset randomly, or channels 116 that are experiencing requests to access the dataset sequentially and are still able to immediately respond to the anticipated request stream to access data are usually enqueued at the back of the CQ_READY list when they are returned to the channel free list after being used either for responding to a request to access data, or for pre-fetching data.

CQ_SERVICE

Channels 116 on the CQ_SERVICE list have been used recently, and are approaching the point where they will be unable to respond immediately to a request to access data from the client workstation 42. Channels 116 on the CQ_SERVICE list that contain an image of data that has been modified by the client workstation 42 may contain dirty file data or metadata that needs to be flushed downstream toward the NDC server terminator site 22. Channels 116 on the CQ_SERVICE list that contain an image of data that is being read by the client workstation 42 may need to have additional data loaded into them from downstream so they can respond immediately to future requests to access data from the client workstation 42. Occasionally, a channel 116 on the CQ_SERVICE list may simultaneously require both flushing of dirty data downstream, and loading of additional data from downstream.

CQ_LOCKED

The channels 116 on this list are hardwired. The channels 116 and all NDC buffers 129 allocated to them are immune from LRU replacement. All intermediate channels 116 in the intermediate NDC sites 26A and 26B are always placed on the CQ-LOCKED list to prevent them from being pulled out from under the corresponding upstream channel(s) 116. Hardwired channels 116 provide dataset connections which respond in a minimum amount of time. By immunizing channels 116 on the CQ_LOCKED list from LRU replacement, the channels 116 can respond swiftly to a request to access data, particularly for applications such as real-time imaging in which minimum delay times are critical.

In the following description of the present invention, the channel free list will often be referred to in the singular, and should be thought of as a single LRU list. The present invention includes the extra complexity of five free lists so channels 116 can be emptied of C_DELAYED_WRITE data, and complex channels 116 broken down into simple channels 116 by channel daemon routines running in the background.

Channels 116 on either the CQ_READY list or the CQ_SERVICE list may contain modified data that represents the current state of the file, i.e., the underlying downstream data has been superseded by modified data from the client workstation 42. When this condition occurs, the NDC buffers 129 assigned to the channel 116 that contain the modified data are flagged as B_DELWRI and the channel 116 is flagged as C_DELAYED_WRITE.

If the NDC 50 needs a channel 116 it first checks the CQ_EMPTY list. If the CQ_EMPTY list has no channels 116, then the NDC 50 checks the CQ_CLEAN list. A channel 116 on this list never has any C_DELAYED_WRITE data, but it might be a complex channel 116 that needs to be broken down into simple channels 116. If the NDC 50 finds a complex channel 116 on the CQ_EMPTY list, reduces the complex channel 116 to a collection of simple channels 116. One channel 116 is then claimed to respond to the request to access data and all remaining simple channels 116 are enqueued at the end of the CQ_EMPTY list.

If the CQ_CLEAN list is also empty, the NDC 50 searches the CQ_READY list. Because the NDC 50 is in the process of responding to a request to access data, the NDC 50 skips down the CQ_READY list and takes the most convenient channel 116. However, the channel 116 selected by the NDC 50 in this manner must be free of C_DELAYED_WRITE data so that no modified data will be lost.

Channel Hash Lists

When the NDC 50 begins processing a new request, the first task is to connect the request to an existing channel 116, if it exists. The channel hash lists enable this connection to be performed very quickly. The first step in the connection function that seeks to find an existing channel 116 is to add the filesystem id and file id together and then divide this sum by the number of hash buckets. The remainder produced by the division operation is used as an index into the array of hash buckets. Each bucket contains a short list of channels 116 that are connected to files whose filesystem id and file id have been hashed into the bucket's index.

Having identified a hash bucket, the next step is to search all the channels 116 on the list for this bucket for an exact match on file server address, filesystem id, and file id. If there is a channel 116 currently connected to the desired dataset, it will be on this list regardless of whether the channel 116 is on or off the channel free list at the moment. Any channel 116 currently connected to a dataset can always be located via this hash mechanism. If a search is performed and the channel 116 isn't located, then none exists.

The c_forw and c_back fields in the structure of the channel 116 disclosed in FIG. 4 are used for linking channels 116 on a hash list. When a channel 116 is removed from the channel free list and re-assigned to access a dataset, c_forw and c_back are set and the channel 116 is immediately linked onto the appropriate hash chain.

Claiming a Channel 116

Routines called ndc_get_channel( ) and ndc_channel_relse( ) make and break connections to channels 116 within an NDC site 22, 24, 26A and 26B.

"Claiming" a channel 116 is the process by which the NDC 50, for the purpose of satisfying a request that it has received to access a new dataset either from a local client via the client intercept routines 102 or from another NDC site via the DTP server interface routines 104, acquires one of the channels 116 that was allocated to the NDC 50 upon initialization of the NDC site. In claiming a channel 116, the ndc_get_channel( ) routine removes the channel 116 from the channel free list, marks the channel 116 C_BUSY, and assigns the channel 116 to a request. Once a channel 116 has been claimed, it is busy and unavailable for use by any other request that the NDC 50 might receive before the channel 116 is released. Thus, a channel 116 is either not busy, and can be found on the channel free list, or it is busy and committed to a request that is currently being processed.

When ndc_get_channel( ) is called to claim a channel 116, one of several situations may arise:

The channel 116 doesn't already exist, so a channel 116 is claimed from the channel free list, assigned to servicing the current request, initialized, linked into the appropriate hash chain, and its pointer returned to the caller.

The channel 116 exists and it's not busy. The channel 116 is removed from the channel free list, it's marked C_BUSY, and its pointer is returned to the caller.

The channel 116 exists and it's busy recalling or disabling image projections at all upstream sites. A NULL pointer is immediately returned to the caller telling him to "back-off" so a consistency operation may complete before the NDC 50 performs any processing on the current request. In this situation, the caller must be a DTP server interface routines 104, since the channel 116 can only recall/disable the channels 116 at upstream NDC sites, such as the NDC sites 26A, 26B. or 24.

The channel 116 exists, is busy (C_BUSY is set), and it is not in the process of recalling or disabling the upstream NDC site that issued the current request. If this condition occurs, the requesting process enters a wait state while simultaneously requesting to be reactivated as soon as the channel 116 returns to the channel free list.

The third situation occurs very rarely. Under certain circumstances, an NDC site, e.g., intermediate NDC site 26A, must send a message to its upstream sites, e.g. NDC sites 26B and 24, that recalls projected images of data that have been modified by a client, e.g. the client workstation 42, and that disables all projected images of data that are being read. Such communications are referred to as recall/disable messages. If an NDC site, e.g., intermediate NDC site 26A, receives a request from an enabled upstream site, e.g., intermediate NDC site 26B, that is projecting an image of data, and the request is directed at a channel 116 that is awaiting the response to a recall/disable message that has been sent to upstream sites 26B and 24, a deadlock situation is imminent. The request that's just been received at this NDC site, e.g., intermediate NDC site 26A, can't be processed until the channel 116 becomes available. But, the channel 116 won't ever be freed until all sites, e.g. NDC sites 26B and 24, have responded to the recall/disable messages. However, the recall/disable message will never be processed at the upstream site, e.g., NDC sites 26B and 24, that just transmitted the new request because the channels 116 at those sites are busy waiting for the response to their outstanding requests.

To avoid such a deadlock condition, whenever an upstream request attempts to claim a channel 116 and discovers that the channel 116 is busy, additional investigation is performed. If the channel 116 is busy processing another client's downstream request, then the NDC 50 just waits until the channel 116 becomes free, after which it claims the channel 116, and returns its pointer to the caller.

However, if the channel 116 is busy processing an upstream request, which is a request from the CCS to all upstream sites to either recall or disable their images of projected data, and if the NDC site originating the current request, i.e., the NDC site that's trying to claim the channel 116 right now, is one of those upstream sites, then ndc_get_channel( ) routine does not pause and await the release of the channel 116. Rather, the ndc_get_channel( ) routine immediately returns a NULL pointer to instruct the caller to release its channel 116.

When a DTP server interface routine 104 calls the ndc_get_channel( ) routine and receives a returned value of a NULL pointer back from the routine, the DTP server interface routines 104 must reject the request it received from upstream. The response is flagged with NDC_RSP_REQUEST_REJECTED to inform the upstream site that this request has been rejected. If there are several NDC sites, such as intermediate NDC site 26B, between the NDC site that initially rejects a request and the NDC client terminator site 24, the rejection must pass up through all the sites until the rejection reaches the client intercept routine 102 of the NDC 50 that originally received the request. Upon receiving a rejection, the client intercept routine 102 of the NDC client terminator site 24 then backs-off. In general, backing-off is a procedure in which:

- a process, such as the client intercept routine 102, is notified that a request has been rejected;
- the process, such as the client intercept routine 102, then releases its channel 116; and
- the recall/disable process claims the channel 116, flushes or invalidates any projected images of the dataset stored in the NDC buffers 129, and then releases the channel 116 so the original process, such as the client intercept routine 102, can re-claim the channel 116 and finally service the client's request.

Backing-off is always performed within client intercept routines 102, and every client intercept routine 102 must be capable of performing this function.

The client intercept routine 102 does not pass rejections from the NDC 50 back to a network client, such as the client workstation 42. The client workstation 42 remains totally unaware of the consistency operations performed by the NDCs 50.

Messages being passed upstream between the NDC sites 22, 26A, 26B and 24 always take precedence if they collide with a message for the same dataset being passed downstream between the NDC sites 24, 26B, 26A and 22. Sending a message upstream to disable or recall projected images at all upstream sites is the first step performed by the CCS in processing a message that has just created a CWS condition. If a collision occurs between an upstream message and a downstream message, the message being passed downstream has already lost the race to the CCS by a wide margin.

As described above, in response to a request to claim a channel 116, the ndc_get_channel( ) routine returns either:

1. a pointer to a new or old channel 116 to the calling routine after having waited a short interval if necessary; or
2. a NULL pointer to indicate that the request for a channel 116 has been rejected and the calling routine must wait and allow consistency operations to proceed.

Channel Request Processing Operations

After a channel 116 has been claimed for the purpose of processing a request, the channel 116 is committed to that request and no other request can use the channel 116 until the current request has completely finished and released the channel 116.

Channel commitment is a process by which client requests directed at the same dataset are sequenced such that each request is fully processed before any processing begins on the next request. However, multiple NDC sites 22, 26A, 26B and 24 may simultaneously receive requests for the same dataset. That is, two or more NDC sites 22, 26A, 26B and 24 may begin processing requests for the same dataset at about the same time, and both of them may be unaware that any other NDC site is accessing the dataset. The NDC consistency mechanism handles all such cases so it appears that there is a single queue for accessing the dataset. However, due to processing and transmission delays among the NDC sites 22, 26A, 26B and 24, the order in which each client requests access to the dataset does not determine which request is processed first. Rather, the request to be processed is the first one received by the CCS as described in greater detail below. Thus, clients that are "closer" to the CCS have a slight advantage in processing priority. This slight advantage probably cannot be detected by application programs executed by the client, such as the client workstation 42.

The concept of committing a channel 116 to a single request until the request has been satisfied is essential to the consistency control mechanism of the NDCs 50. For the simple cases of dataset access in which there is no CWS, NDC sites 22, 26A, 26B and 24 operate autonomously, which means that the channel 116 is released as soon as the operation at the NDC site 22, 26A, 26B and 24 completes. That is, the channel 116 at each NDC site 22, 26A, 26B, and 24 is only committed until the response has been dispatched to the requesting client.

If a CWS condition exists, all NDC sites from the NDC client terminator site 24 down to and including the CCS (which may be located at NDC site 26B, 26A or 22) operate in concurrent mode. When operating in concurrent mode, channels 116 supporting a write operation must remain committed beyond the point at which they dispatch their response to the upstream NDC site. The channels 116 operating in concurrent mode at each NDC 50 remain committed until the upstream NDC site releases them by transmitting either an NDC_FLUSH or an NDC_RELEASE message. For requests from clients to read a dataset when a CWS condition does not exist, the channel 116 is released as soon as the response has been dispatched to the requesting client. Concurrent mode operations are explained more fully below.

Channel Read Operations

When a channel 116 receives a request to read a dataset, it attempts to satisfy the request directly from images already being projected within the channel 116. If additional data is required from downstream, the channel 116 employs a mash and load technique to fetch the downstream data.

As the original client request ripples downstream through successive NDC sites 26B, 26A and 22:

- the DTP server interface routine 104 at each NDC site 26B, 26A or 22 claims a channel 116 that is committed to servicing the request;
- the incoming request is mashed against the image(s) already being projected within the channel 116 at that NDC site 26B, 26A or 22; and
- the NDC 50 at that NDC site 26B, 26A or 22 generates and dispatches a request downstream that specifies only the data that must be loaded from below in order to satisfy the request.

The request propagates from NDC site to NDC site toward the NDC server terminator site 22 until either:

1. the request mashes against an image, or set of images, of all the data requested by the immediately preceding NDC site; or 2. the request reaches the NDC server terminator site 22. In either case, when the request reaches an NDC site having all the requested data, there exists a series of channels 116 stretching back from that NDC site to the NDC client terminator site 24. All channels 116, committed to the request in progress, effectively have a protective shield surrounding them. No other request to access data may penetrate this barrier at any point.

If the chain of committed channels 116 doesn't stretch all the way to the NDC server terminator site 22, it is possible that another request for the same data might be made at an NDC site that is downstream from this chain of channels 116. The downstream NDC site must issue a recall/disable message to all upstream NDC sites. Upon the arrival of this recall/disable message at the downstream end of the chain of channels 116, it is queued to await the availability of the channel 116. As soon as the channel 116 at this NDC site responds to a load request, it is freed from its upstream commitment. The channel 116 then initiates processing on the recall/disable message and forwards the recall/disable message upstream. The recall/disable message propagates much faster than a load response because the load response has to transfer data. Thus, the recall/disable message will closely follow the load response all the way back to the NDC client terminator site 24. As soon as the client intercept routine 102 at the NDC client terminator site 24 dispatches a response to the client such as the client workstation 42, the recall/disable message invalidates all projected images at the NDC client terminator site 24.

Another aspect of the channel load operation is that a downstream channel 116 never begins to respond to a request until all of the requested data is cached within the channel 116. And, when the response is finally sent, the channel 116 need not transmit all of the requested data. The response by the channel 116 at a downstream NDC sit may be flagged as a partial response indicating that more data remains to be transmitted upstream toward the NDC client terminator site 24. Upon receiving a partial response, the upstream NDC site immediately issues a request to the downstream NDC site for the remaining data. The downstream NDC site's response to this request may be either a full or partial response. The upstream NDC site keeps requesting more data until it receives a complete response to its original request. The downstream NDC site never releases the channel 116 until it has dispatched a full response to the upstream NDC site. In this manner, the NDCs 50 respond to each request to access data from a client site, such as the client workstation 42, as an atomic operation.

Channel Write Operations

Datasets are always written at the furthest upstream NDC site possible. The sequence of operations performed in writing a dataset is to:

load into the NDC site an image of the portion of the dataset that will be overwritten;

write to the image of the dataset projected into the NDC site; and flush the buffers that contain modified data downstream toward the NDC server terminator site 22.

The following sections describe the three phases of a write operation in greater detail.

Load Phase

The NDC 50 loads each block of data that is not already present in the NDC buffers 129 and that will be only partially written into the NDC buffers 129. The blocks are loaded by calling an ndc_load( ) routine with a "func" argument of "C_WRITE" to informs the ndc_load( ) routine that it's loading data to be overwritten by a write operation. The flow of the ndc_load( ) routine invoked with the argument C_WRITE is generally the same as it is for a read request, but there are the following differences.

If this is the first write operation since the channel 116 was created, the downstream NDC site must be informed of the write activity even if all necessary data is already present in the NDC buffers 129 of this NDC 50. If this is the first time the dataset will be written at any NDC site, the message informing the downstream NDC site that a write operation is being performed propagates all the way to the NDC server terminator site 22. Thus, if any other client becomes active on the dataset, the CWS condition will be detected.

Blocks that will be completely overwritten don't need to be loaded upstream to the NDC site where the write operation is being performed. Under such circumstances, the ndc_load( ) routine at the NDC site, such as the NDC client terminator site 24, can allocate empty NDC buffers 129 to receive the data being written to the dataset.

As downstream NDC sites respond to requests for loading the data needed to perform the write operation, they are informed of the purpose of the request (message flags==NDC_SITE_WRITING), and they also are informed whether the modified data will be flushed downstream through the NDC site at the conclusion of the write operation. The initial load request also specifies a "flush-level" that specifies the security required for the modified data. Each NDC site between the NDC site writing the data and the NDC server terminator site 22 compares the flush-level to its own capabilities. If any intervening NDC site is able to provide the indicated level of security for the modified data, it flags the load request it is about to issue to its downstream NDC site with NDC_FLUSH_CONTAINED. Thus, each NDC site is able to determine the earliest moment at which the channel 116 can be released from its current commitment. If the upstream NDC site is enabled for caching, then the channel 116 can be released as soon as the data has passed through the NDC site. The associated NDC_UPSTREAM_SITE structure has noted that there is write activity occurring at the upstream site. If any other client should become active on the dataset, all modified data will be recalled from above before any transactions from the new client are processed.

If two NDC sites share a common RAM through which data passes, that data does not "clear" the downstream NDC site until it has "cleared" the upstream NDC site. In this situation, the downstream NDC site must not release the channel 116 when it responds to the original request from upstream. Instead, the downstream NDC site leaves the channel 116 busy until it receives another message from the upstream NDC site informing it that the returned data has now "cleared" the upstream NDC site. This prevents the downstream NDC site from modifying or discarding data upon which the upstream NDC site is still operating.

Write Phase

After buffers in the NDC buffer pool 128 have been allocated to receive the write data, the NDC 50 performs the write operation and all NDC buffers 129 that are modified are marked as being "dirty."

Flush Phase

After the NDC 50 completes the write operation, only one task remains to be accomplished before a response can be dispatched to client, such as the client workstation 42. The write data that has been entrusted to this site must be secured to the level that has been requested by the client, such as the client workstation 42, or demanded by the NDC server terminator site 22 that owns the data. That is, the NDC site at either end of each write transaction may specify the security level. The highest level specified by either end of the write transaction will prevail. Either end of a write transaction may specify any of the following security levels.

NDC_FLUSH_TO_SERVER_DISK
NDC_FLUSH_TO_SERVER_STABLE_RAM
NDC_FLUSH_TO_SITE_DISK
NDC_FLUSH_TO_SITE_STABLE_RAM
NDC_FLUSH_TO_NOWHERE

If neither the client, such as the client workstation 42, or the NDC server terminator site 22 cares very much whether written data is occasionally lost, and both are willing to trade data security for data speed, then the flush phase may be bypassed if both ends of a write transaction specify the security level NDC_FLUSH_TO_NOWHERE. In this case, the write operation has now been completed.

However, if either end of a write transaction specifies a security level higher than NDC_FLUSH_TO_NOWHERE, an ndc_flush( ) routine will be called to flush all dirty NDC buffers 129 to an NDC site with an acceptable level of security. Note that if the level is NDC_FLUSH_TO_SITE_STABLE_RAM and the dirty data at this NDC site is already stored in stable RAM, such as battery backed RAM or FLASH RAM, from which it will not be lost in the event of a power failure, then the ndc_flush( ) routine returns immediately.

The moment the NDC 50 modifies the data, the NDC buffer 129 is tagged as dirty. If the data in a dirty NDC buffer 129 is not flushed downstream at the first opportunity, which occurs immediately before the channel 116 is released at the conclusion of the processing of the write request, then the channel 116 is flagged as C_DELAYED_WRITE.

If a CWS condition does not exist, and if both the client, such as the client workstation 42, and the NDC server terminator site 22 aren't concerned about losing modified data, the data flows upstream to an NDC site where it remains for an extended period of time while being modified. Eventually, the client will stop accessing the dataset, and sometime after that the channel 116 will be moved from the CQ_READY list to the CQ_CLEAN list by a Flush daemon routine. When the channel 116 is moved from the CQ_READY list to the CQ_CLEAN list, any dirty NDC buffer 129 that hasn't been flushed downstream for security reasons and is still lingering about, will be flushed at this time.

Modified data in the NDC buffers 129 of an NDC 50 becomes characterized as C_DELAYED_WRITE data if it was not flushed downstream at the first opportunity upon releasing the channel 116 at the end of a write operation. Dirty data isn't C_DELAYED_WRITE data until the routine that could have flushed the data downstream has been bypassed. When such data is finally flushed downstream, the C_DELAYED_WRITE flag is removed.

If, as part of the load phase of a write request, data is pumped upstream through an NDC site that does not cache an image of the data, the channel 116 at that NDC site must not be released. Under such circumstances, the NDC site that is writing the dataset will soon be flushing data back downstream through this NDC site as the last phase of responding to a write request.

Channel Maintenance Operations

In general, file servers, such as the NDC server terminator site 22, are often under utilized, with their processor(s) spending a significant percentage of their time waiting for work. When engaged in processing requests as described above, NDCs 50 postpone all operations that are not essential to completing the responses. At such times, each NDC 50 performs only those operations absolutely required to respond to the requests. When there are no requests awaiting processing, the NDC 50 activates channel daemons to use the processor's "idle" time for preparing for the next volley of requests that will eventually arrive. Any process of the NDC 50 involved in directly servicing a client request preempts all daemons as soon as the current daemon, if one is operating, relinquishes control.

The Reaper Daemons

The NDC 50 invokes a Reaper daemon routine as a background task whenever the number of channels 116 enqueued on the CQ_EMPTY list drops below the CQ_EMPTY_LOW_THRESHOLD. Responding to this condition, the Reaper daemon routine iteratively removes the channel 116 at the front of the CQ_CLEAN list and releases all NDC buffers 129 assigned to it. If the channel 116 removed from the front of the CQ_CLEAN list is a complex channel 116, the Reaper daemon routine reduces it to a collection of simple channels 116, all of which the Reaper daemon routine places at the front of the CQ_EMPTY list. At this point in the process, the channel 116 from which the Reaper daemon routine removed all the other channels 116 may still contain valid data attributes. Under such circumstances, the Reaper daemon routine enqueues the simple channel 116 at the back of the CQ_EMPTY list because a possibility still exists that the channel 116 may be claimed for responding to a request to access the same dataset before it percolates up to the front of the CQ_EMPTY list to be claimed for responding to a request to access a different dataset.

At the end of each iterative cycle of removing a channel 116 from the front of the CQ_CLEAN list and placing one or more channels 116 on the CQ_EMPTY list, the Reaper daemon routine checks to see if any new requests to access data have been received by the NDC 50. If a new request has been received, the Reaper daemon routine relinquishes control to the foreground task that will respond to the request. The Reaper daemon routine will only resume operation when there no longer are any more pending requests to access data.

If the number of channels 116 enqueued on the CQ_EMPTY list exceeds the CQ_EMPTY_HIGH_THRESHOLD, the Reaper daemon suspends its operation and will not again resume operating until the number of channels 116 enqueued on the CQ_EMPTY list again drops below the CQ_EMPTY_LOW_THRESHOLD.

The Flush Daemon

A Flush daemon routine locates channels 116 on the CQ_LOCKED, CQ_SERVICE, or CQ_READY lists that have been flagged as C_DELAYED_WRITE, and flushes downstream toward the NDC server terminator site 22 all NDC buffers 129 assigned to such channels 116 that are flagged as B_DELWRI. After a channel 116 has been processed by the Flush daemon routine, the channel 116 is enqueued at the end of the CQ_CLEAN, the CQ_SERVICE, or the CQ_LOCKED list depending upon the flags that are set in the channel 116.

The Loadmaster Daemon

The NDC 50 invokes a Loadmaster daemon routine whenever there are no responses pending to requests to access data. The Loadmaster daemon routine checks channels 116 enqueued on the CQ_SERVICE list and assigns them individually to Supervisor daemon routines which perform the services required by the channel 116. After a channel 116 has been serviced, it is enqueued on the end of the CQ_READY list.

The Supervisor Daemons

The Supervisor daemon routines receive channels 116 that have been removed from the CQ_SERVICE list by the Loadmaster daemon routine, forecast future requests to access data that will be forthcoming from the client(s), such as the client workstation 42, and generate any requests for services from downstream NDC sites that are necessary so the channel 116 can respond immediately to a request from the client to access data. After the NDC 50 receives responses from downstream NDC sites to the requests generated by the Supervisor daemon routine, the channel 116 is enqueued at the end of the CQ_READY list.

The Loader Daemon

Loader daemon routines are low level routines that perform simple asynchronous tasks needed for the operation of the NDC 50, such as submitting a request to a downstream NDC site or to a disk subsystem, and then waiting for a response to that request.

Channel Release

After a request has been completely serviced at an NDC site 22, 24, 26A, or 26B, the channel 116 is released. The process for releasing channels 116 operates as follows:

If dirty data is being projected within the channel 116, the NDC 50 calls the ndc_flush( ) routine to ensure that all modified data is secured to a level acceptable to both the client and the server.

If the downstream channel 116 is still committed, the NDC 50 sends it a release message and waits until a response is received. The release message may, in some instances, propagate downstream through all NDC sites until it reaches the NDC server terminator site 22.

If one or more processes are waiting for this channel 116 or any channel 116, all of them are scheduled to run.

Enqueue the channel 116 at the tail of the channel free list.

Reset channel flags: C_BUSY, C_WANTED, C_ASYNC, and others.

After all of the preceding operations have been performed, the channel 116 becomes available for use by any other request that has already been received or will arrive in the future.

Channel Death

Most channels 116 eventually die. The primary cause of death is invariably lack of use. As long as channels 116 are continually used, they continue to live. When a channel 116 dies, the following operations are performed:

Any dirty data that is still being retained within the channel 116 is flushed downstream toward the NDC server terminator site 22.

If the downstream channel 116 is still committed, the NDC 50 sends it a notification that the channel 116 is in the process of dying. This notification will piggyback on any dirty data being flushed downstream. However, at this point there usually isn't any dirty data still lingering in the channel 116. The thresholds established for the various channel daemons cause them to flush modified data downstream toward the NDC server terminator site 22 more quickly than the channel daemons reclaim channels 116.

After receiving a response from the NDC 50 at the downstream NDC site 22, 26A or 26B to the decease notification, the NDC 50 releases all resources allocated to the channel 116 and the channel 116 is flagged as invalid and empty.

If the death of the channel 116 was initiated by a demand for a new channel 116, the channel 116 is returned to the requesting process.

If the death of the channel 116 was caused by the operation of a channel daemon, the channel 116 is enqueued at the head or tail of the CQ_EMPTY free list, depending upon whether or not the attributes for the dataset stored in the channel 116 remain valid.

Only channels 116 located at the NDC client terminator site 24 ever suffer death by lack of use. Downstream channels 116 are always enqueued on the CQ_LOCKED free list when they're not busy. Channels 116 on the CQ_LOCKED free list, immune against LRU replacement, only die when notified by their last upstream channel 116 that it is dying, or when the upstream site fails to respond to status queries and is presumed to be dead.

Downstream channels 116 are the communication links that bind the channels 116 of the NDC client terminator site 24 to the NDC server terminator site 22. Downstream channels 116 cannot be re-allocated without isolating all upstream channels 116 from consistency control operations. If an NDC site becomes isolated temporarily from the network due to a communications failure and if any other clients remaining on the network process datasets for which the isolated NDC sites have active channels 116, after communications are restored any data modifications performed at the formerly isolated NDC site must be rejected by downstream NDC sites when the formerly isolated NDC site subsequently attempts to flush the data back downstream toward the NDC server terminator site 22. Thus, downstream channels 116 only die when the upstream channel 116 dies or, at least, is thought to be dead.

Data image projections are sustained in downstream channels 116 only when that channel 116 has multiple upstream connections and, even then, only under certain circumstances. So, downstream channels 116 rarely retain resources of the NDC site when enqueued on the channel free list. Only the channel structure itself, approximately 500 bytes, must remain committed to providing the linkage between the upstream and downstream sites.

When projected, NDC metadata, e.g., filesystem and file attributes, is always stored directly within the channel structure. This means that idle downstream channels 116 still retain information about the dataset to which they're connected.

The three events that can trigger the death of a channel 116 are:

The channel 116 advances to the head of the channel free list and a request is made for a new channel 116. When this occurs, after flushing any dirty data within the channel 116 at the head of the channel free list downstream toward the NDC server terminator site 22, the channel 116 is re-allocated to support accessing a new dataset after downstream NDC sites have been properly notified that the channel 116 is dying.

The NDC 50 receives a decease notification from the last remaining upstream NDC site that is accessing the dataset. The decease notification message causes the downstream NDC site to enter the death sequence and may result in a decease notification propagating further downstream toward the NDC server terminator site 22.

A channel usage timer indicates that there has been no activity on the channel 116 for quite a while. If the channel 116 is located at the NDC client terminator site 24, it can just be killed at this point. If the channel 116 is located downstream from the NDC client terminator site 24, the channel 116 must send a status query message to all its upstream connections. This status query message indicates the urgency with which the downstream NDC site wishes to kill the channel 116. After responding to the status query message, the upstream NDC client terminator site 24 may kill its channel, but the upstream NDC client terminator site 24 need not do so. However, upstream NDC sites must respond within a reasonable interval to the status query from the downstream NDC site or the downstream NDC site will assume the upstream channel 116 has died.

NDC Inter-Site Operations

Both control and data information must be communicated between NDC sites 22, 26A, 26B and 24. Data communicated between NDC sites 22, 26A, 26B and 24 is always one or more byte sequences of the named dataset. Control information is a bit more complicated, and can be categorized as follows:

NDC metadata is information about the named dataset such as: filesystem and file attributes, server name, filesystem id, and file id.

DTP control is information generated by and used by the NDC sites 22, 26A, 26B and 24 to ensure the consistency of all delivered data and NDC metadata.

DTP control information is interwoven into the fabric of the DTP, the protocol through which both data and NDC metadata are passed between NDC sites 22, 26A, 26B and 24.

FIG. 9 is a table written in the C programming language that lists various different types of DTP messages 52 that may be exchanged between pairs of NDC sites, such as the NDC sites 22, 26A, 26B, and 24. FIG. 10 defines a data structure in the C programming language that is used in assembling any of the various different DTP messages 52 listed in FIG. 9. FIGS. 11A through 11I define data substructures in the C programming language that are incorporated into the channel 116 illustrated in FIG. 4 and in the data structure for DTP messages 52 illustrated in FIG. 10. FIG. 12 defines a structure in the C programming language that is used in forming chains of DTP messages 52 thereby permitting several DTP messages 52 to be exchanged between NDC sites as a single atomic communication.

Metadata for each channel 116 consists of all of the data stored in each channel 116 except for the data requested by a client, such as the client workstation 42, that is stored in the NDC buffers 129. Two data structures in each channel 116 contain the metadata that is most vital to the performance of the channel 116. FIG. 13A defines a data structure NDC_ATTR in the C programming language that specifies information about the named set of data to which the channel 116 is attached. FIG. 13B defines a data structure NDC_STATS in the C programming language that contains information about the file system on which the dataset resides.

Described below are the various modes in which the NDC site 22, 24, 26A and 26B operate, and the consistency operations that must be performed between the NDC sites 22, 24, 26A and 26B.

Modes of Operation

An NDC site 22, 24, 26A and/or 26B operates in one of two modes, autonomous or concurrent.

Autonomous Mode of Channel Operation

Whenever possible, a channel 116 services a request using only locally available resources. For clients that are accessing data sequentially, the channel 116 aggressively pre-fetches or pre-buffers ahead of the client's current requests to access data. This mode of operation for channel 116 is referred to as "autonomous." A channel 116 is said to have operated autonomously whenever it responds to a request from a client, such as the client workstation 42, using only data and NDC metadata cached at its NDC site 22, 24, 26A or 26B prior to receiving the request. Datasets no larger than 144 k bytes are usually completely stored in the NDC buffers 129 at the NDC client terminator site 24, enabling all requests to access datasets smaller than 144 k bytes to be serviced autonomously by the NDC client terminator site 24.

NDC sites that are permitted to cache projected images of data have a potential to operate autonomously. A channel 116 located at an NDC site that is not permitted to cache projected images of data cannot operate autonomously. Channels 116 located at NDC sites that are not permitted to cache projected images of data must always transmit a request downstream to an NDC site in responding to each request from a client, such as the client workstation 42.

Autonomous operation of channels 116 is the major cornerstone upon which very large scale distributed file systems can be built. Autonomous operation of channels 116 provide the basis for:

Quick response times. Since the channel 116 of an NDC site 22, 24, 26A or 26B that is operating autonomously doesn't need to communicate with downstream NDC sites in responding to a request to access data from a client, the client, such as the client workstation 42, does not experience any of the delays inherent in such communication.

High bandwidth data transfers. If the NDC client terminator site 24 is located within the client workstation 42, the data transfer rate can be extremely high (50 to 100 Mbytes/sec). A response from the channel 116 to a client's request to access data when both the channel 116 and the client operate in the same computer need only consist of a return of pointers to the data that the channel 116 had previously stored in the NDC buffers 129 of the NDC client terminator located within the client workstation 42.

Network scalability. For the average dataset, channels 116 located in NDC sites 26A, 26B or 24 that operate autonomously place no load on downstream NDC sites 22, 26A or 26B after the dataset has been loaded into the NDC client terminator site 24. Downstream NDC sites 22, 26A or 26B must initially supply data and NDC metadata to the channel 116 in the NDC client terminator site 24 that operates autonomously. However, once the data and NDC metadata are respectively stored in the NDC buffers 129 of the channel 116 of the NDC 50, the client, such as the client workstation 42, may access the data and metadata many times without requiring any further communication between the NDC client terminator site 24 and the downstream NDC sites 26B, 26A or 22. If each NDC site 24, 26B or 26A does not need to repetitively request data from downstream NDC sites, the networked digital computer system 20 can support a larger number of clients, such as the client workstation 42, with an acceptable response time.

The advantages of operating in autonomous mode are so significant that every reasonable effort is made to ensure that channels 116 operate in this mode whenever possible. The inability to operate a channel 116 autonomously is always the result of a single cause, i.e., the required data and metadata isn't being projected into the local NDC site 26A, 26B or 24.

When operating in autonomous mode, an NDC site 22, 26A, 26B or 24 functions in a manner similar to the CCS. Whenever possible, the channels 116 of such an NDC site respond to requests to access data from a client, such as the client workstation 42, without communicating with downstream NDC site 26B, 26A or 22. If an upstream message should arrive at an NDC site 26A, 26B or 24 that is operating in autonomous mode while the NDC site 26A, 26B or 24 is processing a request on that same channel 116, the upstream message must wait until the NDC site 26A, 26B or 24 is able to process to it. An autonomous NDC site 22, 26A, 26B or 24 has every right to operate as though it is the CCS until it is notified that it can no longer function in that manner. If the upstream message is a notification that the NDC site 26A, 26B or 24 may no longer function autonomously, that notice doesn't become effective until the NDC 50 processes the message.

After the client workstation 42 first requests access to data from the NDC client terminator site 24, the NDC sites 22, 26A, 26B and 24 establish their local channels 116, and the NDC sites 22, 26A and 26B load the first data into the NDC buffers 129 of the NDC client terminator site 24, the locally projected dataset image will always be sufficient to enable autonomous request servicing unless one of the following occurs:

Access to the same dataset by another client creates a CWS condition. If this occurs, the downstream CCS only permits images to be projected into the NDC site 26A, 26B or 24 during a brief instant as the projected data passes through the NDC site 26A, 26B or 24.

A client, such as the client workstation 42, requests access to data randomly, and the dataset being accessed by the client is too large to be completely cached at the NDC client terminator site 24. Random accesses to data by a client, such as the NDC client terminator site 24, prevents the channel 116 from anticipating future requests from the client. If a channel 116 determines that a client, such as the client workstation 42 is accessing data randomly, the channel 116 stops pre-fetching data for that client.

If neither of the preceding conditions occur, channels 116 operate autonomously, pre-fetching data in anticipation of future requests to access data from the client, such as the client workstation 42. Depending on the current load being supported at NDC sites 22, 26A, 26B and 24, channels 116 at NDC sites that are operating autonomously pre-fetch data either asynchronously or synchronously.

Asynchronous Pre-fetching

A channel daemon usually pre-fetches data for a channel 116 that is operating autonomously. The channel daemon keeps the image of data projected into the channel 116 just ahead of the next request to access data that the channel 116 receives from the client, such as the client workstation 42. If the main goal of the pre-fetch mechanism was to minimize the usage of local resources, the projected image would consist of only the exact data specified in the next client request, and the image of the data would always be projected just in advance of the client's next request. However, while this may conserve the resources at the NDC client terminator site 24, it is very wasteful of resources of the networked digital computer system 20. It is much more efficient for the networked digital computer system 20 to employ fewer requests and transfer larger amounts of data in response to each request to load data into the NDC client terminator site 24. However, transferring a larger amount of data will increase any delay in responding to a client request.

To minimize the delay in responding to a client request to access data, the channel 116 usually requests from the downstream NDC site 26B, 26A or 22 only that data which is required to respond to the current request to access data. As soon as the channel 116 receives the data, the channel 116 responds to the client, such as the client workstation 42. As soon as the channel 116 in the NDC client terminator site 24 responds to the request from the client, the NDC 50 begins processing any other client requests that have been queued. After the NDC 50 processes all queued client requests, channel daemons may begin operating in the background. As described above, operating channel daemons continuously check all active channels 116 to determine if the channels 116 are within one request time interval of being unable to immediately respond to a request from the client, such as the client workstation 42.

If a channel daemon detects that a channel 116 is within one request time interval of being unable to immediately respond to a request from the client, the daemon does whatever is necessary to obtain additional data from downstream NDC sites 26B, 26A and 22 so the image of data projected into the channel 116 stays ahead of requests to access data from the client. For a channel 116 in the NDC client terminator site 24 that is supporting read operations on datasets, the channel daemon asynchronously issues a request to the downstream NDC site 26B requesting roughly enough data to respond to the next eight requests from the client, such as the client workstation 42. When the data arrives from the downstream NDC site 26B, the channel 116 stores the data in the NDC buffers 129 selected by the daemon. The NDC buffers 129 used to receive the data are frequently the ones that are already being used by the channel 116 for the current projected image of data. In this way, that portion of the image that the NDC 50 has already presented to the client is replaced by a portion of the dataset toward which requests from the client are advancing.

If a request from the client, such as the client workstation 42, arrives while a channel daemon is refilling the channel 116, the NDC 50 blocks the request until the downstream operation initiated by the channel daemon completes. Thus, if channel daemons successfully anticipate client requests to access data, the channel 116 continues to operate autonomously.

Synchronous Pre-Fetching

The asynchronous mode of autonomous operation shifts as much processing as possible from the foreground task of servicing requests from the client, such as the client workstation 42, into the background task of preparing to service the next request from the client. The strategy of shifting processing from the foreground task to the background task trades off throughput for response time. Clients, such as the client workstation 42, experience faster response times, but the NDC site 22, 26A, 26B or 24 has reduced throughput capacity. This is a reasonable trade off since NDC sites 22, 26A, 26B and 24 rarely run near their throughput capacity. However, intervals in the operation of NDC sites 22, 26A, 26B and 24 will occur that require maximum throughput rather than minimum response time. During intervals of peak demand, a normally unused synchronous mode of pre-fetching data from downstream NDC sites replaces the asynchronous mode to maximize the throughput of the NDC sites 22, 26A, 26B and 24.

The synchronous mode of operation is activated if CPU utilization at an NDC site 22, 26A, 26B or 24 exceeds a pre-established threshold. In synchronous mode, the channel daemons are not activated and the routines for responding to requests to access data no longer defer to the channel daemons the loading of data into and unloading of data from the channels 116. When the NDC 50 operates in synchronous mode, data is requested from downstream NDC sites only if the upstream NDC site is unable to respond to a request.

If a channel 116 requires additional data and the NDC 50 is operating in synchronous mode of autonomous operation, the channel 116 requests the required data from the downstream NDC site data plus additional data to increase the efficiency of loading data into the channel 116 at this site. During intervals in which the NDC 50 operates in synchronous mode, large amounts of data are fetched directly by the channel 116 each time the channel 116 discovers that additional data not present in the NDC buffers 129 of this NDC site 22, 26A, 26B or 24 is required to respond to a request. By requesting large amounts of data from downstream NDC sites only when the channel 116 is unable to respond to a request to access data, the channel 116 maximizes throughput of its NDC 50, but clients, such as the client workstation 42, experience additional delay each time the channel 116 is compelled to request data from a downstream NDC site 26B, 26A or 22.

Concurrent Mode of Channel Operation

Projected images of data occur only in channels 116 that are operating autonomously. As explained in greater detail below, autonomous channels 116 always occur at, or downstream of, a CCS or an NDC client terminator site 24 that is functioning similar to a CCS. NDC sites 26A, 26B or 24 upstream of the CCS, when the CCS is located in the NDC server terminator site 22, always operate in concurrent mode. NDC sites 26A, 26B or 24 upstream of the CCS, when the CCS is located in the NDC server terminator site 22, operate as an extension of the CCS site through which the image of the dataset being projected into the CCS may be viewed.

Channels 116 operating in concurrent mode sustain an image of projected data for only the briefest period, i.e., from the time the channel 116 receives the data from the downstream NDC site until the channel 116 forwards data to the next upstream NDC site or to the client, such as the client workstation 42. Channels 116 operating in concurrent mode always request exactly the data required to satisfy the current request, never more and never less.

Consistency Control Operations

Figure 15:
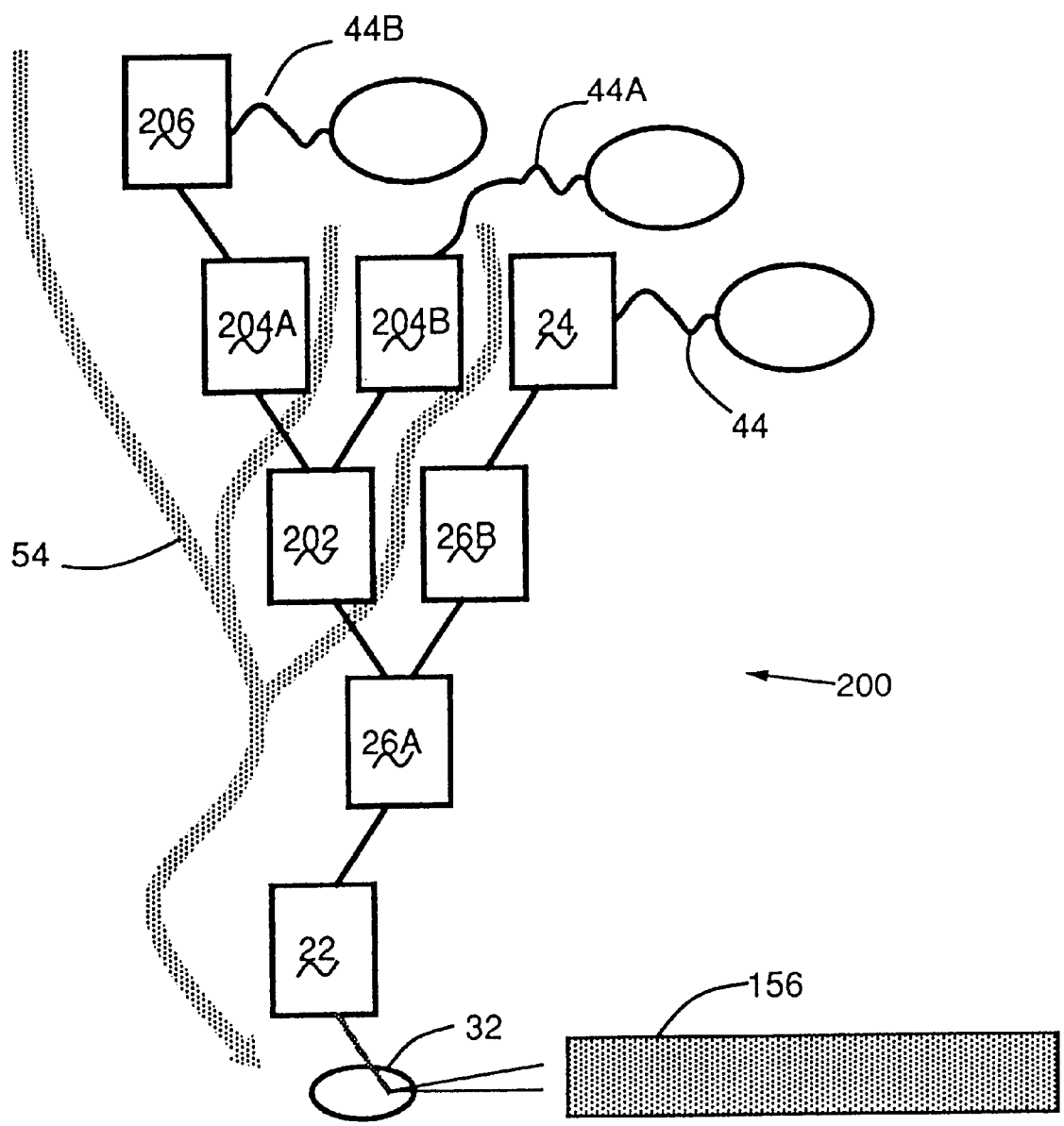
FIG. 15 is a block diagram illustrating a tree of NDC sites including an NDC server terminator site having a stored file that may be accessed from a plurality of NDC client terminator sites.

FIG. 15 depicts a tree, indicated by the general reference character 200, of NDC sites 22, 26A, 26B, 24, 202, 204A, 204B, and 206 that are connected to the file 156. LAN 44A connects to NDC client terminator site 204B while LAN 44B connects to NDC client terminator site 206. If a CWS condition were created by a combination of the NDC site 24 and either NDC site 204B or 206, NDC site 26A becomes the CCS for the file 156. NDC site 26A is as far as the file 156 can be projected from the NDC server terminator site 22 without requiring a distributed cache consistency mechanism.

If a CWS condition does not exist, all NDC sites 22, 26A, 26B, 24, 202, 204A, 204B, and 206 may operate autonomously. The NDC sites 22, 26A, 26B, 24, 202, 204A, 204B, and 206 when operating autonomously may sustain a projected image of data that may be used to support client read and write operations over an extended period of time. Autonomous sites communicate with the next downstream NDC site 204A, 202, 26B, 26A, or 22 only when the upstream NDC site 206, 204A, 204B, 202, 26A, 26B, or 24 requires additional data, or when modified data must be flushed downstream toward the NDC server terminator site 22.

However, if a CWS condition arises, the first NDC site 26A or 202 upstream of the data source, such as the hard disk 32, that provides multiple connections to the dataset for upstream NDC sites 206, 204B, or 24 must assume responsibility for maintaining the consistency and integrity of all operations being performed on the dataset. The NDC site 26A or 202 that assumes this responsibility is located furthest from the source of the data, such as the hard disk 32, through which must pass all requests to access the dataset from current clients, such as the client workstation 42. Thus, if a CWS condition were created by a combination of the NDC site 24 and either NDC site 204B or 206, NDC site 26A would become the CCS for the file 156.

If one of the NDC sites 26A or 202 declares itself to be the CCS for the dataset, the NDC site 26A or 202:

1. recalls the image of the dataset that has been modified from the upstream NDC client terminator site 206, 204B, or 24 so that its image of the data contains all the modifications; and
2. disables all other upstream projections of the data that were in use by NDC sites to support read operations on the dataset.

After completing these operations, the CCS is now the most distant NDC site into which images of the dataset will be projected. Upstream NDC sites must now operate in concurrent mode, forwarding any requests they receive to access the dataset to the CCS for processing. The CCS processes requests to access the dataset in the order they are received, and ensures completion of each request before beginning to process a succeeding request to access the dataset.

Detecting CWS

Each of the NDC sites 22, 26A, 26B, 24 202, 204A, 204B, and 206 independently records whether a request to access a dataset will or will not modify the dataset. As an NDC site 22, 26A, 26B, 202, or 204A processes each request to access a dataset, it compares the requested operation with the operations that are being performed on the dataset at all other upstream NDC sites. If there are multiple upstream NDC sites accessing a dataset and any one of them is writing the dataset, then a CWS condition exists. As soon as an NDC site 26A or 202 detects a CWS, the NDC site 26A or 202 must declare itself to be the CCS as described above.

To permit each NDC site 22, 26A, 26B, 202 and 204A to detect a CWS condition, each upstream NDC site 206, 204A, 204B, 202, 24, 26B, and 26A must keep its downstream NDC site informed of types of accesses, i.e., a "read" access that will not modify the dataset or a "write" access that will modify the dataset, that are being made to the dataset at the NDC client terminator site 206, 204B, or 24.

Each downstream NDC site 204A, 202, 26B, 26A, and 22 must record and preserve the information provided it by its upstream NDC sites until the downstream NDC site 204A, 202, 26B, 26A, or 22 is notified of the death of the channel 116 at the upstream NDC site.

Informing Downstream NDC Sites

If a client, such as the client workstation 42, begins accessing a dataset with a new type of access, e.g., accessing the dataset with a "write" operation when all previous accesses have been "read" operations, the NDC site 26A, 26B or 24 responding to requests from the client must inform the downstream NDC site 22, 26A or 26B. Usually, this notification takes place automatically when the NDC site 26A, 26B or 24 requests access (NDC_LOAD message) to the dataset from the downstream NDC site 22, 26A or 26B. Since each NDC site 24, 26B and 26A requests only the data that is not present in its NDC buffers 129, the data requested by each successive NDC site 24, 26B or 26A may change from that requested from it. However, the nature of the request to access the dataset doesn't change. A request from a client, such as the client workstation 42, to the NDC client terminator site 24 to "read" a dataset remains a "read" operation as it propagates downstream from NDC site to NDC site. Similarly, a request to "write" a dataset remains a "write" as it propagates downstream.

However, if an image of a dataset has been projected in response to a request to read the dataset, and if the client then seeks to modify the dataset in an area that is wholly contained within the NDC buffers 129 of the NDC site 26A, 26B or 24, then no additional data is required from downstream NDC sites 22, 26A or 26B. However, if this occurs the dataset cannot be written immediately since the possibility exists that another client accessing the dataset at another NDC site might also be requesting to write the dataset. If two clients concurrently write the same dataset, there would then be two projected images of the same named set of data that, most likely, would be different!

Therefore, if a client seeks to perform a write operation on a projected image of a dataset that will overlay only data already loaded into the NDC buffers 129 of the NDC client terminator site 24 in response to requests to read the dataset, the NDC site 24 must send an inform message to downstream NDC sites 26B, 26A or 22. An inform message from an upstream NDC site 26A, 26B or 24 requests no data from the downstream NDC site 22, 26A or 26B. The inform message merely informs the downstream NDC site 22, 26A or 26B that write operations are now being performed on the dataset at the upstream NDC site 26A, 26B or 24.

After an NDC site 26B or 26A is informed, either implicitly or explicitly, that a write operation is being performed at an upstream NDC site 26B or 24, and if the activity on this dataset at upstream NDC sites 26B or 24 differs from the type of activity that was already being supported at the NDC site 26A or 26B, the NDC site 26A or 26B must transmit the inform message further downstream toward the NDC server terminator site 22.

An inform message propagating downstream from NDC site to NDC site may be rejected at any NDC site. If an inform message is rejected by a downstream NDC site, the rejection must propagate upstream until it reaches the client intercept routine 102 of the NDC site that originated the request. Upon receiving the rejection of an inform message, the client intercept routine 102 backs-off and allows a recall/disable message, which has either already arrived or will arrive very shortly, to claim the channel 116 and recall or disable the image of the data currently present in the NDC buffers 129.

Upstream Site Structures

Figure 14:
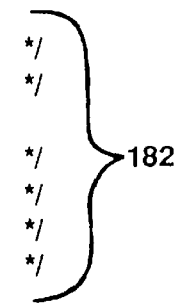
FIG. 14 is a definition written in the C programming language setting forth the structure of an upstream site structure that is used by the NDC of FIGS. 3 and 7 for storing information about the activity of upstream NDC sites in accessing a dataset stored at the NDC server terminator site.

An NDC site 22, 26A or 26B receiving information about the activities occurring on a dataset at an upstream NDC site 26A, 26B or 24 must record and preserve the information. FIG. 14 depicts an upstream site structure 182, that is used by NDC sites 22, 26A, 26B, 202 or 204A to record and preserve information about activities occurring on a dataset at an upstream NDC site. Each NDC 50 creates upstream site structures 182 as required by invoking a memory allocation routine (such as the Unix malloc ( ) routine) to request an area in RAM of about 16 to 20 bytes. The NDC 50 returns the RAM allocated for each upstream site structure 182 to the free memory pool upon receiving a decease notification from the upstream NDC site for which the NDC 50 created the upstream site structure 182.

If NDC site 22, 26A, 26B, 202, or 204A has multiple upstream connections to the same dataset, it will have the same number of instances of the upstream site structures 182, one per upstream NDC site. The upstream site structures 182 are linked together using the *next element in each upstream site structure 182. The *uss element in the channel 116 for the dataset points at the first upstream site structure 182 in the list of upstream site structures 182. The *next entry in the last upstream site structure 182 in the list is assigned a NULL value. A NULL value is assigned to the *uss element in the channel 116 at the NDC client terminator site 24 indicating that there are no sites further upstream.

The other elements of the upstream site structure 182 are:

upstream_addr which is the address of the upstream NDC site;

current_state which is the state that this NDC site believes the upstream NDC site to be in;

actual_state which is returned by the upstream NDC site in its response to a recall/disable message; and error which preserves an error condition occurring during a recall/disable operation until such time that the operation can be presented to the upstream NDC sites.

Channel Decease Notifications

The downstream NDC site 22, 26A, 26B, 202, or 204A must at all times be aware of the types of activities being performed at its upstream NDC sites. When channels 116 upstream from an NDC site 22, 26A, 26B, 202, or 204A are about to die, they must inform their downstream NDC site. When a channel 116 dies, it ceases whatever type of activity it had been performing.

If a downstream NDC site 26A or 202 that is currently the CCS receives a decease notification from a channel 116 at an upstream NDC site, the current CCS may determine that the CWS condition no longer exists. When this occurs, the CCS relinquishes the CCS function and allows images of data to be re-projected into upstream NDC sites in response to requests to access data.

If a channel 116 receives a decease notification from its only upstream NDC site 26A, 26B, 24, 202, 204A, 204B, or 206 and there are no local clients such as the client workstation 42 accessing the dataset, the channel 116 immediately dies. In dying, each channel 116 issues its own decease notification to its downstream NDC site.

Recall/Disable Messages

If an NDC site 22, 26A, 26B, 202 or 204A receives an inform message, which occurs implicitly in every communication from upstream NDC sites, the NDC site 22, 26A,

26B, 202, or 204A checks to determine if this type of activity is already being supported at the upstream NDC site. If this type of activity is not already being supported at the upstream NDC site, then the new type of activity may have created a CWS condition.

If a NDC site 26A or 202 determines that a CWS condition has just been created, it must immediately disable all upstream projections of the dataset and recall any data that has been modified at the upstream NDC site 206, 204B, or 24. To disable all upstream projections and recall any modified data, the downstream NDC site 26A or 202 processes its list of upstream site structures 182, sending a disable message to each upstream NDC site 206, 204B, and/or 24 that is reading the dataset, or a recall message to the single upstream NDC site 206, 204B, or 24 that is writing the data set.

Ignoring for the time being the NDC site 206, 204B, or 24 whose request to access data created the CWS-condition, when an NDC site 202 or 26A determines that it must become the CCS, there can only be one or more client workstations 42 that are reading the dataset, or a single client workstation 42 that is writing the data set. In responding to the CWS condition, the newly declared CCS either issues a single recall message to an upstream NDC site, or one or more disable messages. The manner in which a CWS condition occurs determines whether the CCS will send either a single recall message or one or more disable messages.

If one or more client workstations are accessing the dataset for reading it and a client workstation subsequently begins to write the dataset, then the newly declared CCS issues disable messages to all upstream NDC sites other than the one that created the CWS condition, and then appropriately responds to the request just created the CWS condition. If the NDC client terminator site that created the CWS condition has in its NDC buffers 129 a projected image of all the data needed for writing the dataset, then the newly declared CCS merely informs the NDC client terminator site that the projected image of the data must be flushed back to the CCS upon completion of the write operation. If the NDC client terminator site that created the CWS condition has requested additional data from downstream NDC sites because its NDC buffers 129 lack a projected image of all the data needed for writing the dataset, then the newly declared CCS does whatever is necessary to supply the NDC client terminator site with the requested data and concurrently instructs the NDC client terminator site that it must flush the projected image of the data back to the CCS upon completion of the write operation.

If a single client workstation is writing the dataset and another client workstation subsequently creates a CWS condition by accessing the dataset for any purpose, then the newly declared CCS issues a single recall message to the NDC client terminator site that has been writing the dataset, waits for the projected image of the dataset to be flushed back from the NDC client terminator site to the CCS, and then does whatever is necessary to respond to the request that created the CWS condition.

If several clients, such as the client workstation 42, are widely distributed across a network and concurrently submit requests that will result in a CWS condition, the message from each NDC site races with messages from the other NDC site(s) to whichever NDC site will eventually become the CCS. The first message to reach the NDC site that will become the CCS is processed first and blocks the further processing of later arriving messages until it has been completely processed. All messages arriving after the first message queue up in the order of their arrival at the NDC site that will eventually become the CCS. After the first message is completely processed, these later arriving messages are processed one after another in the order of their arrival. Eventually the NDC 50 processes the message that creates the CWS condition. When the CWS condition occurs, the NDC 50 immediately dispatches the recall/disable message (s) to the upstream NDC sites. Any messages from other NDC sites that remain enqueued at the newly declared CCS are processed in order, and each is rejected because the channel 116 is busy recalling or disabling the NDC sites that issued these messages.

Responding to a CWS condition does not necessarily require two different types of messages, i.e., a disable message and a recall message. A single type of message that commanded upstream NDC sites to disable their caches, and flush dirty data back to the CCS as part of the disable process at the upstream NDC sites would suffice. However, using two distinct message types allows the upstream NDC sites to confirm their agreement on the current state of their channels 116.

Upstream and Downstream Messages

Recall and disable messages are referred to as "upstream" messages, because they flow upstream from the NDC site that transmits them. The status query is another type of upstream message. Except for decease notifications, all other requests are initiated by real clients, such as the client workstation 42, and always flow downstream. Such messages may be generically referred to as "downstream" messages.

If there are multiple upstream NDC sites, several recall/disable messages are all transmitted asynchronously at about the same time. The process generating these messages then blocks the processing of additional messages for the channel 116 at this NDC site until all upstream NDC sites have responded or until the time interval allowed for a response expires. If an NDC site fails to respond within the time allowed, a timeout error is recorded in the appropriate upstream site structure 182. If later an upstream channel 116 for which a timeout error has been recorded attempts to re-establish communication with the downstream channel 116, it will be notified that it has been disconnected from the dataset. If clients along a path were only reading a dataset, it is likely that they may continue processing the dataset without being notified of the disruption. However, if one of the clients has modified an image that is stored within the NDC buffers 129 at an NDC site that has been disconnected from the network perhaps due to a communication failure, and the dataset's modification time indicates that the dataset has been modified since service was interrupted, then if an attempt is made to flush the modified data back toward the NDC server terminator site 22, the flush request must be rejected. The rejection of the flush request must propagate to all upstream NDC sites, and cause an error message to be presented to the client, such as the client workstation 42.

In addition to communication failures, other types of errors are also possible during a recall/disable operation. Any errors that occur along an upstream path during a recall/disable operation are stored in the appropriate upstream site structure 182, and are presented to downstream NDC sites later. Errors that occur outside of the direct connection between the client, such as the client workstation 42, and the NDC server terminator site 22 cannot affect the result of operations performed on the dataset by the client at the NDC client terminator site 24. Upstream errors are processed the next time NDC sites along the path experiencing the error request access to the dataset.

The RLCCS Mechanism

To guarantee dataset consistency while simultaneously providing very good response times to requests from clients, such as the client workstation 42, the present invention implements a concept called ReLocatable Consistency Control Sites ("RLCCS"). Under RLCCS, the first NDC site along the path from the NDC server terminator site 22 to the NDC client terminator site 24 that detects a CWS condition becomes the dataset's CCS. If a CWS condition does not exist, there is no CCS since there is no dataset consistency issue that needs to be resolved. However, when a CWS condition arises, there can be only one NDC site responsible for maintaining the consistency between all projected images. This site will always be the first upstream NDC site that has multiple upstream connections.

RLCCS is the means by which the CCS is located in the most extended position possible to enable the maximum amount of non-distributed consistency control. RLCCS ensures that the CCS is positioned to most efficiently resolve dataset contention arising from a CWS condition.

RLCCS implements non-distributed cache consistency control strategy in a file level distributed cache. Instead of passing messages between caching sites, such as the NDC sites 26A and 202, to maintain a consistent projection of the data cached at the various NDC sites, each NDC site monitors the type of activity occurring at each of its upstream NDC sites and disables caching at those sites when a CWS condition occurs.

If an NDC site determines that the activity at its upstream NDC sites creates a CWS condition, the NDC site becomes the CCS for the file 156 and issues recall/disable messages to all of its upstream NDC sites. Each upstream site, upon receiving a recall/disable message, recalls or disables all of its upstream NDC sites before responding to the message from the newly established CCS. After the recall activity completes, the CCS and all NDC sites downstream of the CCS are enabled for caching, and all NDC sites upstream of the CCS operate as conduits for file data that is passing through them.

Relocation of the CCS, if it becomes necessary, is performed only when the CCS receives a request that creates a CWS condition. As described below, there are two basic methods of relocating the CCS.

Upstream Relocation of the CCS

Upstream relocation moves the CCS to an NDC site that is closer to the client, such as the client workstation 42, than the present CCS. A DTP response to a request to access data includes a "use ticket" that accompanies data which is being passed upstream from NDC site to NDC site. The DTP use ticket may be marked as USE_ONCE or USE_MANY depending upon whether the image of the data may remain cached at an NDC site after it has been used to respond to the request that caused the data to be fetched from downstream. The DTP use ticket for an image of data is always marked as USE_MANY when it begins its journey from the NDC server terminator site to the client site. However, as the image of the data passes upstream from NDC site to NDC site, its use may be restricted to USE_ONCE at any NDC site through which it passes. Thus, when the image of the data passes through the current CCS for the file 156 the channel 116 at that NDC site changes the data's DTP use ticket from USE_MANY to USE_ONCE.

As the image of the file 156 is projected through successive NDC sites, if the DTP use ticket is marked as USE_MANY, the image of the data may remained cached within the NDC buffers 129 assigned to the channel 116 through which the image traverses the NDC site. Whether or not any data remains cached within the NDC buffers 129 assigned to the channel 116 after passing through the NDC site is determined solely by the local site. Maintaining a projected image of data at an NDC site is a resource allocation issue, and each NDC site must maintain control of its own resources. However, if the DTP use ticket is marked USE_ONCE, none of the data may remain cached within the NDC buffers 129 assigned to the channel 116 after traversing the NDC site.

Upstream relocation of the CCS due to a decease notification requires only that the current CCS recognize if it no longer has multiple upstream NDC sites engaged in CWS activities. When that occurs, the NDC site that formerly was the CCS merely stops marking the DTP use ticket USE_ONCE. This change in the marking of the DTP use ticket immediately permits upstream NDC sites to begin caching any images of the file 156 that may be projected into them in the future.

However, if one of the upstream NDC sites currently has additional upstream NDC sites that are creating a CWS condition, that NDC site will declare itself to be the new CCS and begin changing the DTP use ticket from USE_MANY to USE_ONCE. In this way, the NDC 50 of the present invention facilitates relocating the CCS upstream.

Downstream Relocation of the CCS

Relocating the CCS downstream moves the CCS to an NDC site closer to the NDC server terminator site 22. Referring to FIG. 15, if no clients are accessing the file 156 and then if a client on LAN 44B requests access for writing the file 156 residing on the NDC server terminator site 22, a projected image of the file 156 flows from NDC site 22, through NDC sites 26A, 202, 204A, and into NDC site 206. The client may now read and write the projection of the file 156 present in the NDC client terminator site 206 with an unlimited number of simultaneous processes without the NDC client terminator site 206 checking with any of the downstream NDC sites 204A, 202 or 26A, or with the NDC server terminator site 22 before each operation. The NDC client terminator site 206 need communicate with the downstream NDC sites 204A, 202, 26A and 22 only to load or unload data from the channel 116 at the NDC client terminator site 206.

If a client on LAN 44A connected to the NDC site 204B begins to access the file 156 for writing it, the NDC client terminator site 204B claims a channel 116 that then sends an NDC_LOAD message to intermediate NDC site 202. The NDC_LOAD message from the channel 116 will indicate that NDC site 204B is loading data that will be overlaid by a write operation. Upon processing this NDC_LOAD message, the NDC site 202 finds that a channel 116 already exists for the file 156. The existing channel 116 identifies NDC site 204A as a current upstream NDC site, and also indicates that the channel 116 for the file 156 is currently enabled. This combination of conditions implies that the CCS for the file 156, if one exists, is located either at NDC site 204A or at an NDC site upstream from NDC site 204A. As described above, the upstream site structures 182 at the NDC site 202 not only identify all upstream NDC sites accessing the file 156, they also indicate the type of file operations that have occurred at each NDC site accessing the file 156. These few facts, i.e. the existence of a CWS condition and that the CCS is not currently located downstream from the NDC site 202 enable site 202 to determine that it should declare itself the CCS.

While holding off the write request from the NDC site 204B, NDC site 202 recalls or disables all upstream NDC sites that are caching projected images of the file 156. As described above, "disable" is sufficient for any NDC sites at which the file 156 was only being read. However, if there are any sites that have modified their image of the file 156, their dirty data must flushed back to the new CCS, NDC site 202. Therefore, NDC site 202 sends a recall message to NDC site 204A.

Before NDC site 204A responds to the recall message from NDC site 202, NDC site 204A transmits its own recall message upstream to NDC client terminator site 206. After all of upstream NDC sites have responded to the recall message from NDC site 204A, NDC site 204A will respond back to NDC site 202, forwarding any dirty data that had been soiled by NDC site 204A, or by NDC sites upstream from NDC site 204A.

After NDC site 204A responds to the recall message from NDC site 202, NDC site 202 can begin processing the write request from NDC site 204B. NDC site 202 has now declared itself to be the CCS for file 156. NDC site 202 is now in charge of sequencing all read/write operations that are requested for the file 156 by its own clients, and by clients of all upstream NDC sites, e.g. NDC sites 204A, 204B and 206.

While the intermediate NDC site 202 remains the CCS with multiple connections to upstream NDC sites 204A and 204B at least one of which is writing the file 156, no file data or metadata will be cached upstream of the intermediate NDC site 202. If, after all NDC sites that were accessing the file 156 for writing have disconnected from the file 156, the intermediate NDC site 202 as CCS still has one or more upstream NDC sites that are reading the file 156, the CCS will relocate upstream as described above.

INDUSTRIAL APPLICABILITY

Within a networked digital computer system, file servers, workstations, gateways, bridges, and routers are all potential candidates to become an NDC site. The NDC 50 is a software module that can easily be ported to different environments. The NDC 50 requires a minimum of 250 k bytes of RAM, of which 50 k is code and the remainder is allocated for various data structures and buffers. Each channel 116 occupies approximately 500 bytes of RAM. Thus, one megabyte of RAM can accommodate about two thousand channels 116. At current memory prices, this amount of RAM costs well under $50. As illustrated in FIG. 4, the structure for the subchannel 118 included in each channel 116 provides pointers to 18 NDC buffers 129. In the preferred embodiment of the invention, each NDC buffer 129 stores 8 k bytes of projected data. Thus, the eighteen NDC buffers 129 associated with each channel 116 can store an image of up to 18*8 k bytes, i.e. 144 k bytes. Thus, with no additional subchannels 152, each channel 116 can accommodate the complete projection, both of data and of NDC metadata, of any dataset of up to 144 k bytes in length.

An NDC site having only 250 k bytes RAM would be useful for only certain limited applications. Each site usually allocates anywhere from 4 to 256 megabytes of RAM for its NDC 50. For example, a 128 megabyte NDC site that allocates 32 megabytes of RAM for NDC data structures can maintain over 50,000 simultaneous connections to data conduits 62 while also storing 96 megabytes of data image projections. Because accessing large datasets may require more than one channel 116, the number of simultaneous dataset connections will vary depending on the mix of datasets which are currently being accessed.

With so many channels 116 packed into a single NDC site, the task of quickly connecting a new request to the channel 116 for the specified dataset, or claiming the least recently used channel 116 if there is none, might seem to be a daunting feat. However, the NDC 50 provides two mechanisms that facilitate solving this problem. The channel hash lists and the channel free list are methods of stringing together the channels 116 in such a way that any particular channel 116, or the least recently used channel 116, can be quickly located. Moreover, preferably the number of hash buckets allocated at each NDC site is adjusted so that, on the average, there are 4 channels 116 in each hash bucket. Limiting the number of channels 116 in each hash bucket to 4 permits quickly determining whether or not an NDC site presently has a channel 116 assigned to accessing a particular dataset.

If the NDC client terminator site 24 receives a request from the client workstation 42 to access a dataset for which the NDC client terminator site 24 is also the NDC server terminator site, and if the request seeks to access data that is not currently being projected into the NDC buffers 129 of the NDC site 24, the delay in responding to the first request as measured at the client intercept routine 102 is approximately 25 milliseconds (about the same as for NFS). However, once the NDC 50 dispatches a response to the client workstation 42, the site will employ intelligent, efficient, and aggressive read ahead to ensure that as long as the client workstation 42 continues to access the file sequentially, data will almost always be projected into the NDC buffers 129 of the NDC client terminator site 24 before the client workstation 42 requests to access it. By prefetching data in this manner, responses to most subsequent requests from the client workstation 42 can be dispatched from the NDC client terminator site 24 to the client workstation 42 within 100 microseconds from the time the NDC site 24 receives the request.

If the client workstation 42 requests to access a dataset that is at an NDC site other than the NDC client terminator site 24, such as NDC sites 26B, 26A or 22, responding to the first request from the client workstation 42 requires an additional 25 millisecond delay for each NDC site that must respond to the request. However, because the NDC client terminator site 24 attempts to pre-fetch data for the client workstation 42, the NDC site 24 will dispatch responses to subsequent requests from the client workstation 42 in about 100 microseconds as described above.

While the presently preferred embodiment of the NDC 50 is implemented in software, it may also be implemented in firmware by storing the routines of the NDC 50 in a Read Only Memory ("ROM"). Furthermore, the operation of the NDC 50 is independent of any particular communication hardware and protocol used to implement the LAN 44, and of the filesystem that is used for accessing the hard disks 32, 34 and 36. Analogously, the operation of the NDC 50 is independent of the communication hardware and communication protocol by which DTP messages 52 pass between pairs of NDC sites 22–26A, 26A–26B, or 26B–24. The communication hardware and protocols for exchanging DTP messages 52 include backplane buses such as the VME bus, local area networks such as Ethernet, and all forms of telecommunication. Accordingly, DTP messages 52 exchanged between NDC sites may pass through gateways, including satellite data links, routers and bridges.

Figure 16:
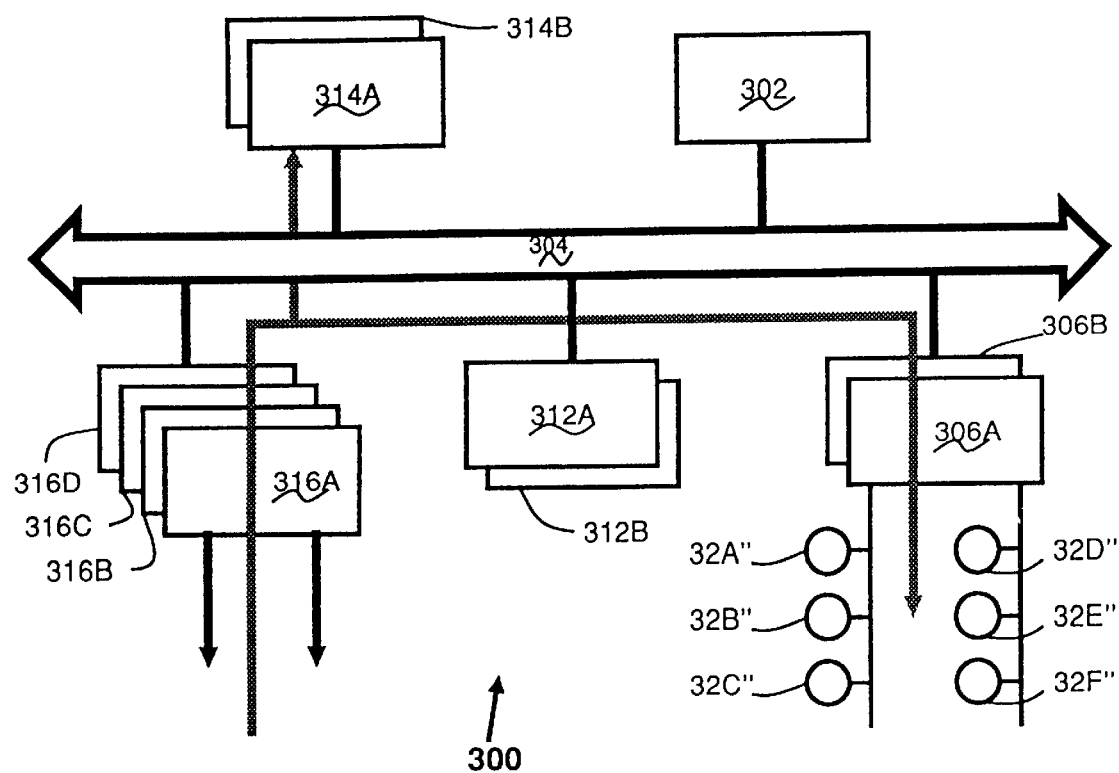
FIG. 16 is a block diagram illustrating the application of the NDC within a file server employing a network of digital computers.

While the NDC 50 has been described thus far in the context of a distributed multi-processor computer system 20 in which various NDC sites, such as the sites 22, 26A, 26B and 24, are envisioned as being separated some distance from each other, the NDC 50 may also be applied effectively within a single computer system that incorporates a network of computers. FIG. 16 depicts a file server referred to by the general reference character 300. Those elements depicted in FIG. 16 that are common to the digital computer system 20 depicted in FIG. 1 carry the same reference numeral distinguished by a double prime ("″") designation. The file server 300 includes a host processor 302 for supervising its overall operation. Within the file server 300, an internal bus 304, perhaps a VME bus, couples the main host processor 302 to a pair of storage processors 306A and 306B. The storage processors 306A–B control the operation of a plurality of hard disks 32A″ through 32F″. The internal bus 304 also couples a pair of file processors 312A and 312B, a pair of shared primary memories 314A and 314B, and a plurality of Ethernet processors 316A through 316D to the host processor 302, to the storage processors 306A–B, and to each other.

During the normal operation of the file server 300 without the incorporation of any NDCs 50, the Ethernet processors 316A–D receive requests to access data stored on the disks 32A″ through 32F″ from clients such as the client workstation 42 that is illustrated in FIG. 1. The requests received by the Ethernet processors 316A–D are transferred to one of the file processors 312A–B. Upon receiving a request to access data, the file processor 312A or 312B communicates with one of the storage processors 306A or 306B via the internal bus 304 to effect the transfer an image of the data from the disks 32A″ through 32F″ into the primary memories 314A–B. After an image of the requested data has been transferred into the primary memories 314A–B, the Ethernet processor 316 that received the request then transmits the requested data to the client thereby responding to the request.

The file processors 312A–B may incorporate a hard disk cache located in the primary memories 314A–B. The presence of a hard disk cache in the file server 300 allows it to respond to some requests to access data without any communication between one of the file processors 312A–B and one of the storage processors 306A–B. However, even though the file server 300 includes a hard disk cache, during operation of the file server 300 responding to each request to access data received by the Ethernet processors 316A–D necessarily involves communications between the Ethernet processors 316A–D and the file processors 312A–B. That is, even though data needed by the Ethernet processors 316A–D for responding to requests is already physically present in the primary memories 314A–B, to gain access to the data the Ethernet processors 316A–D must first communicate with the file processors 312A–B because the data is stored in a hard disk cache under the control of the file processors 312A–B.

To enhance the overall performance of the file server 300, each of the Ethernet processors 316A–D may incorporate an NDC 50 operating as NDC client terminator site. Each NDCs 50 included in the Ethernet processors 316A–D accesses a set of NDC buffers 129 allocated within the primary memories 314A–B. In addition to the NDCs 50 included in the Ethernet processors 316A–D, the file server 300 may also include other NDCs 50 operating as NDC server terminator sites in the file processors 312A–B. The NDCs 50 in the file processors 312A–B also access a set of NDC buffers 129 allocated within the primary memories 314A–B.

In a file server 300 so incorporating NDCs 50, if one of the Ethernet processors 316A–D receives a request to access data that is already present in the NDC buffers 129 of its NDC 50, its NDC 50 may respond immediately to the request without communicating with an NDC 50 located in one of the file processors 312A–B. Analogously, if one of the Ethernet processors 316A–D receives a request to access data that is not present in its NDC buffers 129 but that is present in the NDC buffers 129 of the NDCs 50 in the file processors 312A–B, those NDCs 50 may also respond immediately to the request without accessing the hard disk cache controlled by the file processors 312A–B. Under such circumstances, the NDC 50 operating in the file processors 312A–B may immediately respond to a request from the NDC 50 operating in the Ethernet processors 316A–D merely by providing it with a pointer to the location of the data within the primary memories 314A–B. Thus, by employing NDCs 50 both in the Ethernet processors 316A–D and in the file processors 312A–B, data that is physically present in NDC buffers 129 located in the primary memories 314A–B becomes available more quickly to the Ethernet processors 316A–D for responding to requests from clients such as the client workstation 42 by eliminating any need to access the hard disk cache controlled by the file processors 312A–B.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. In a network of digital computers that includes a plurality of Network Distributed Cache ("NDC") sites, each NDC site including an NDC that has an NDC buffer, a method used in projecting through an NDC client terminator site an image of a stored dataset that is accessed through an NDC server terminator site, the network including a pair of NDC sites both of which can access a shared memory, the method comprising the steps of:

(a) a first one of said pair of NDC sites receiving via the network a request to access data in the stored dataset, the request to access data being initially transmitted from a client site to the NDC client terminator site;

(b) the NDC of the first NDC site checking the NDC buffer thereof to determine if a projected image of data requested from the stored dataset is already present there;

(c) if the NDC buffer of the first NDC site does not contain a projected image of all data requested from the stored dataset, and if the first NDC site is not the NDC server terminator site for the stored dataset, and if a second one of said pair of NDC sites is closer to the NDC server terminator site for the stored dataset than the first NDC site, the NDC of the first NDC site transmitting a request for data from the stored dataset downstream to the second NDC site;

(d) if the NDC buffer of the second NDC site, which is located in the shared memory, does not contain a projected image of all data requested from the stored dataset by the first NDC site, and if the second NDC site is the NDC server terminator site for the stored dataset, the NDC of the second NDC site accessing the stored dataset to project an image of the requested data into the NDC buffer of the second NDC site;

(e) if the NDC buffer of the second NDC site does not contain a projected image of all data requested from the stored dataset by the first NDC site, and if the second NDC site is not the NDC server terminator site for the stored dataset, the NDC of the second NDC site transmitting a request for data from the stored dataset downstream to an NDC site of the network that is closer to the NDC server terminator site for the stored dataset than the second NDC site to effect projection of an image of the requested data upstream into the NDC buffer of the second NDC site;

(f) when the NDC buffer of the second NDC site contains a projected image of all data requested from the stored dataset by the first NDC site, the NDC of the second NDC site transmitting to the first NDC site a pointer to a location in the NDC buffer of the second NDC site which contains the requested data;

(g) the first NDC site, upon receiving from the second NDC site the pointer to the location in the NDC buffer of the second NDC site which contains the requested data, returning from the NDC buffer of the second NDC site an image of the requested data upstream toward the client site that initially requested access to data from the stored dataset.

* * * * *